(12) United States Patent
Ghatage et al.

(10) Patent No.: US 12,386,796 B2
(45) Date of Patent: Aug. 12, 2025

(54) END-TO-END IDENTIFICATION OF ERRONEOUS DATA USING MACHINE LEARNING AND SIMILARITY ANALYSIS

(71) Applicant: Accenture Global Solutions Limited, Dublin (IE)

(72) Inventors: Prakash Ghatage, Bangalore (IN); Nirav Jagdish Sampat, Mumbai (IN); Kumar Viswanathan, San Jose, CA (US); Harsh Kumar Katiyar, Bangalore (IN); Billy Hart, Norwalk, OH (US); Amit Porwal, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 261 days.

(21) Appl. No.: 18/158,774

(22) Filed: Jan. 24, 2023

(65) Prior Publication Data

US 2023/0169054 A1    Jun. 1, 2023

Related U.S. Application Data

(63) Continuation-in-part of application No. 16/263,894, filed on Jan. 31, 2019, now abandoned.

(30) Foreign Application Priority Data

Feb. 21, 2018  (IN) .............................. 201841006604

(51) Int. Cl.
  *G06F 16/215*   (2019.01)
  *G06Q 10/00*    (2023.01)
  *G06Q 20/40*    (2012.01)

(52) U.S. Cl.
  CPC .......... *G06F 16/215* (2019.01); *G06Q 10/00* (2013.01); *G06Q 20/4016* (2013.01)

(58) Field of Classification Search
  CPC ... G06F 16/215; G06Q 10/00; G06Q 20/4016
  See application file for complete search history.

(56) References Cited

U.S. PATENT DOCUMENTS 6,249,774 B1   6/2001   Roden et al.
7,219,148 B2   5/2007   Rounthwaite et al.
(Continued)

FOREIGN PATENT DOCUMENTS

WO   2012075336 A1   6/2012

OTHER PUBLICATIONS

Chen., et al., "Implementing Document Imaging and Capture Solutions with IBM Datacap," Oct. 2, 2015, pp. 1-352, Retrieved from the Internet: [URL:https://www.redbooks.IBM.com/abstracts/SG247969.html] [retrieved on Oct. 27, 2015].

*Primary Examiner* — Huawen A Peng
(74) *Attorney, Agent, or Firm* — Polsinelli PC

(57) ABSTRACT

A device may process data associated with a first entity and a second entity, using one or more machine learning techniques, to identify a set of trends associated with a set of documents. The device may receive new documents associated with the first entity and the second entity. The device may generate, based on the set of trends, a first set of exceptions indicating that a new document is associated with a first type of error. The device may generate, using a similarity analysis technique, a second set of exceptions indicating that a new document is associated with a second type of error. The device may communicate with one or more systems to perform one or more actions associated with correction or prevention of processing errors relating to the new document based a claim relating to the first set of exceptions or the second set of exceptions.

6 Claims, 9 Drawing Sheets

(56) References Cited

U.S. PATENT DOCUMENTS

| | | | |
|---|---|---|---|
| 9,043,247 B1 | 5/2015 | Hart et al. | |
| 9,417,974 B2* | 8/2016 | Larson | G06F 16/2322 |
| 9,547,686 B1* | 1/2017 | Kashalikar | G06F 16/215 |
| 10,303,771 B1 | 5/2019 | Jezewski | |
| 10,467,550 B1 | 11/2019 | Gupta et al. | |
| 2002/0169678 A1 | 11/2002 | Chao et al. | |
| 2010/0254615 A1* | 10/2010 | Kantor | G06F 18/22 |
| | | | 382/218 |
| 2014/0153787 A1 | 6/2014 | Schmidtler et al. | |
| 2015/0170147 A1 | 6/2015 | Geckle et al. | |
| 2016/0063636 A1* | 3/2016 | Feimster | G06Q 40/08 |
| | | | 705/4 |
| 2016/0117588 A1 | 4/2016 | Muraoka et al. | |
| 2018/0011846 A1 | 1/2018 | Guzman et al. | |
| 2018/0032842 A1 | 2/2018 | Yellapragada et al. | |
| 2018/0089585 A1 | 3/2018 | Rickard, Jr. et al. | |
| 2019/0075081 A1* | 3/2019 | Adam | H04L 63/20 |
| 2019/0228419 A1 | 7/2019 | Sampath | |
| 2019/0251149 A1 | 8/2019 | Moyers | |
| 2019/0266610 A1 | 8/2019 | Ghatage et al. | |
| 2021/0065186 A1 | 3/2021 | Kramme et al. | |

\* cited by examiner

600 →

610 — Obtain data associated with a set of documents, the data being associated with a first entity and a second entity, the set of documents having already been processed 620 — Process, using one or more machine learning techniques, the data to determine a first group of trends and a second group of trends, each associated with values included in the set of documents, wherein the first group of trends identifies relationships between the values included in the set of documents and particular processing outcomes associated with the set of documents, and wherein the second group of trends identifies relationships indirectly related to, and being associated with further analyzing to prevent, the particular processing outcomes, and wherein at least one trend of the first group of trends or the second group of trends is related to at least one of a document submission time, a document submission source, a document value, or a document error 630 — Receive a set of new documents associated with the first entity and the second entity 640 — Generate, using a data model associated with the first group of trends and the second group of trends, a prediction value indicating a likelihood of the new documents being problematic documents based on one or more values included in new documents, of the set of new documents, the prediction value including at least one of , a prediction value indicating a likelihood that a particular document causes a cancellation based on a discrepancy, or a prediction value indicating a likelihood that a particular document causes a dispute based on a discrepancy (6B)

650 — Generate, for the particular document, an exception from at least one of a first set of exceptions indicating that the new documents are problematic documents, the exception being based on the prediction value satisfying a threshold associated with one or more of the first group of trends or the second group of trends, or a second set of exceptions indicating that the particular document is duplicative of one or more other documents of the set of new documents, the exception being based on using a similarity analysis technique, the exception being associated with causing or being capable of causing a data structure of the first entity to update erroneously 660 — Generate a set of claims based on the exception 670 — Perform, prior to further processing the set of new documents and based on the set of claims, one or more actions associated with correction or prevention of one or more processing errors relating to the set of new documents, the one or more processing errors relating to at least one of the first set of exceptions or the second set of exceptions

FIG. 6B

END-TO-END IDENTIFICATION OF ERRONEOUS DATA USING MACHINE LEARNING AND SIMILARITY ANALYSIS

CROSS-REFERENCE TO RELATED APPLICATIONS

This Patent application claims priority to India Patent Application No. 201841006604, filed on Feb. 21, 2018, and entitled "TRANSACTION MANAGEMENT USING MACHINE LEARNING AND SIMILARITY ANALYSIS" and is a continuation-in-part (CIP) of U.S. patent application Ser. No. 16/263,894, filed on Jan. 31, 2019, and entitled "TRANSACTION MANAGEMENT USING MACHINE LEARNING AND SIMILARITY ANALYSIS." The disclosures of the prior Applications are considered part of and are incorporated by reference into this Patent Application.

BACKGROUND

A platform may execute processes to manage control and visibility over a life cycle of an entity. For example, a process may be used to monitor reception, verification, processing, execution, reconciliation, or reporting of data. The process may be used for error-correction associated with the data to ensure that data associated with the entity is error-free.

SUMMARY

Some implementations described herein relate to a device. The device may include one or more memories and one or more processors communicatively coupled to the one or more memories. The one or more processors may be configured to obtain data associated with a set of documents, the data being associated with a first entity and a second entity, the set of documents having been processed. The one or more processors may be configured to process, using one or more machine learning techniques, the data to determine a first group of trends and a second group of trends, each group of trends associated with values included in the set of documents, wherein the first group of trends identifies relationships between the values included in the set of documents and particular processing outcomes associated with the set of documents, wherein the second group of trends identifies relationships indirectly related to, and being associated with further analyzing to prevent, the particular processing outcomes, and wherein at least one trend of the first group of trends or the second group of trends is related to at least one of a document submission time, a document submission source, a document value, or a document error. The one or more processors may be configured to receive a set of new documents associated with the first entity and the second entity. The one or more processors may be configured to generate, using a data model associated with the first group of trends and the second group of trends, a prediction value indicating a likelihood of the new documents being problematic documents based on one or more values included in new documents, of the set of documents, the prediction value including at least one of, a prediction value indicating a likelihood that a particular document causes a cancellation based on a discrepancy, or a prediction value indicating a likelihood that a particular document causes a dispute based on a discrepancy. The one or more processors may be configured to generate, for the particular document, an exception from at least one of, a first set of exceptions indicating that the new documents are problematic documents, the exception being based on the prediction value satisfying a threshold associated with one or more of the first group of trends or the second group of trends, or a second set of exceptions indicating that the particular document is duplicative of one or more other documents of the set of new documents, the exception being based on using a similarity analysis technique, the exception being associated with causing or being capable of causing a data structure of the first entity to update erroneously. The one or more processors may be configured to generate a set of claims based on the exception. The one or more processors may be configured to perform, prior to further processing the set of new documents and based on the set of claims, one or more actions associated with correction or prevention of one or more processing errors relating to the set of new documents, the one or more processing errors relating to at least one of the first set of exceptions or the second set of exceptions.

Some implementations described herein relate to a method. The method may include obtaining, by a device, historical transactional information associated with a set of historical transactional documents between a client organization and a vendor organization. The method may include training, by the device, one or more data models on the historical transactional information, wherein the one or more data models are able to identify one or more trends associated with values included in the set of historical transactional documents, the one or more trends relating to an expected set of values for a transaction in a transactional document as the set of values relate to other values in the transactional document or characteristics of the transactional document. The method may include receiving, by the device, a set of transactional documents associated with transactions between the client organization and the vendor organization. The method may include providing, by the device, one or more values included in a particular transactional document, of the set of transactional documents, as input to a data model, of the one or more data models, wherein the one or more values included in the particular transactional document, when input to the data model, cause the data model to output one or more prediction values, wherein each prediction value, of the one or more prediction values, indicates a likelihood of a particular value, of the one or more values included in the particular transactional document, being an indicator of whether the particular transactional document is a problematic transactional document, a problematic transactional document being a type of transactional document that includes a prediction of at least one of an error among values in a transactional document, fraud associated with the transactional document, or an error to occur when processing the transactional document. The method may include generating, based on the one or more prediction values, a first set of exceptions indicating that one or more transactional documents, of the set of transactional documents, are problematic transactional documents. The method may include generating, by the device and by using a similarity analysis technique, a second set of exceptions indicating that one or more additional transactional documents, of the set of transactional documents, are duplicate transactional documents, wherein the duplicate transactional documents have caused an account of the client organization to update erroneously or are capable of causing the account of the client organization to update erroneously. The method may include generating, by the device, a set of claims based on at least one of, one or more exceptions, of the first set of exceptions, or one or more exceptions, of the second set of exceptions, wherein each claim is associated with a verification of whether: an exception, of the first set of exceptions, is a valid exception, or an exception, of the second set of exceptions, is a valid exception. The method may include performing, by the device and based on the set of claims, one or more actions associated with correction or prevention of transaction processing errors relating to the set of transactional documents.

Some implementations described herein relate to a non-transitory computer-readable medium that stores instructions. The instructions, when executed by one or more processors of a one or more instructions that, when executed by one or more processors, may cause the one or more instructions that, when executed by one or more processors to obtain historical transactional information associated with a set of historical transactional documents between a client organization and a vendor organization. The instructions, when executed by one or more processors of the one or more instructions that, when executed by one or more processors, may cause the one or more instructions that, when executed by one or more processors to determine one or more trends associated with values included in the set of historical transactional documents by using one or more machine learning techniques to process the historical transactional information. The instructions, when executed by one or more processors of the one or more instructions that, when executed by one or more processors, may cause the one or more instructions that, when executed by one or more processors to receive a set of transactional documents associated with transactions between the client organization and the vendor organization. The instructions, when executed by one or more processors of the one or more instructions that, when executed by one or more processors, may cause the one or more instructions that, when executed by one or more processors to generate, based on the one or more trends, a first set of exceptions indicating that one or more transactional documents, of the set of transactional documents, are problematic transactional documents. The instructions, when executed by one or more processors of the one or more instructions that, when executed by one or more processors, may cause the one or more instructions that, when executed by one or more processors to generate, using a similarity analysis technique, a second set of exceptions indicating that one or more additional transactional documents, of the set of transactional documents, are duplicate transactional documents, wherein the duplicate transactional documents have caused an account of the client organization to update erroneously or are capable of causing the account of the client organization to update erroneously. The instructions, when executed by one or more processors of the one or more instructions that, when executed by one or more processors, may cause the one or more instructions that, when executed by one or more processors to provide the first set of exceptions and the second set of exceptions to a device associated with the client organization. The instructions, when executed by one or more processors of the one or more instructions that, when executed by one or more processors, may cause the one or more instructions that, when executed by one or more processors to receive, from the device associated with the client organization and based on providing the first set of exceptions and the second set of exceptions, a set of claims based on at least one of, one or more exceptions, of the first set of exceptions, or one or more exceptions, of the second set of exceptions, wherein each claim is associated with a verification of: an exception, of the first set of exceptions, as a valid exception, or an exception, of the second set of exceptions, as a valid exception. The instructions, when executed by one or more processors of the one or more instructions that, when executed by one or more processors, may cause the one or more instructions that, when executed by one or more processors to receive the set of claims from the device associated with the client organization. The instructions, when executed by one or more processors of the one or more instructions that, when executed by one or more processors, may cause the one or more instructions that, when executed by one or more processors to perform, based on the set of claims, one or more actions associated with correction or prevention of transaction processing errors relating to the set of transactional documents.

According to some possible implementations, a device may include one or more memories and one or more processors that are communicatively coupled to the one or more memories. The one or more processors may obtain historical transactional information associated with a set of historical transactional documents between a client organization and a vendor organization. The one or more processors may determine one or more trends associated with values included in the set of historical transactional documents by using one or more machine learning techniques to process the historical transactional information.

The one or more processors may receive a set of transactional documents associated with transactions between the client organization and the vendor organization. The one or more processors may generate, based on the one or more trends, a first set of exceptions indicating that one or more transactional documents, of the set of transactional documents, are problematic transactional documents. The one or more processors may generate, using a similarity analysis technique, a second set of exceptions indicating that one or more additional transactional documents, of the set of transactional documents, are duplicate transactional documents. The duplicate transactional documents may have caused an account of the client organization to update erroneously or may be capable of causing the account of the client organization to update erroneously.

The one or more processors may generate a set of claims based on one or more exceptions, of the first set of exceptions, and/or one or more exceptions, of the second set of exceptions. Each claim may verify an exception, of the first set of exceptions, as a valid exception, or an exception, of the second set of exceptions, as a valid exception. The one or more processors may perform, based on the set of claims, one or more actions associated with correction or prevention of transaction processing errors relating to the set of transactional documents.

According to some possible implementations, a method may include obtaining, by a device, historical transactional information associated with a set of historical transactional documents between a client organization and a vendor organization. The method may include training, by the device, one or more data models on the historical transactional information. The one or more data models may be able to identify one or more trends associated with values included in the set of historical transactional documents.

The method may include receiving, by the device, a set of transactional documents associated with transactions between the client organization and the vendor organization. The method may include providing, by the device, one or more values included in a particular transactional document, of the set of transactional documents, as input to a data model of the one or more data models. The one or more values included in the particular transactional document, when input to the data model, cause the data model to output one or more prediction values. Each prediction value may indicate a likelihood of a particular value, of the one or more values included in the particular transactional document, being an indicator that the particular transactional document is a problematic transactional document.

The method may include generating, based on the one or more prediction values, a first set of exceptions indicating that one or more transactional documents, of the set of transactional documents, are problematic transactional documents. The method may include generating, by the device and by using a similarity analysis technique, a second set of exceptions indicating that one or more additional transactional documents, of the set of transactional documents, are duplicate transactional documents. The duplicate transactional documents may have caused an account of the client organization to update erroneously or may be capable of causing the account of the client organization to update erroneously.

The method may include generating, by the device, a set of claims based on one or more exceptions, of the first set of exceptions, and/or one or more exceptions, of the second set of exceptions. Each claim may verify an exception, of the first set of exceptions, as a valid exception, or an exception, of the second set of exceptions, as a valid exception. The method may include performing, by the device and based on the set of claims, one or more actions associated with correction or prevention of transaction processing errors relating to the set of transactional documents.

According to some possible implementations, a non-transitory computer-readable medium may store one or more instructions that, when executed by one or more processors, cause the one or more processors to obtain historical transactional information associated with a set of historical transactional documents between a client organization and a vendor organization. The one or more instructions may cause the one or more processors to determine one or more trends associated with values included in the set of historical transactional documents by using one or more machine learning techniques to process the historical transactional information.

The one or more instructions may cause the one or more processors to receive a set of transactional documents associated with transactions between the client organization and the vendor organization. The one or more instructions may cause the one or more processors to generate, based on the one or more trends, a first set of exceptions indicating that one or more transactional documents, of the set of transactional documents, are problematic transactional documents. The one or more instructions may cause the one or more processors to generate, using a similarity analysis technique, a second set of exceptions indicating that one or more additional transactional documents, of the set of transactional documents, are duplicate transactional documents. The duplicate transactional documents may have caused an account of the client organization to update erroneously or may be capable of causing the account of the client organization to update erroneously.

The one or more instructions may cause the one or more processors to provide the first set of exceptions and the second set of exceptions to a device associated with the client organization. The device associated with the client organization may generate a set of exceptions based on one or more exceptions, of the first set of exceptions, and/or one or more exceptions, of the second set of exceptions. Each claim may verify an exception, of the first set of exceptions, as a valid exception, or an exception, of the second set of exceptions, as a valid exception.

The one or more instructions may cause the one or more processors to receive the set of claims from the device associated with the client organization. The one or more instructions may cause the one or more processors to perform, based on the set of claims, one or more actions associated with correction or prevention of transaction processing errors relating to the set of transactional documents.

BRIEF DESCRIPTION OF THE DRAWINGS

FIGS. 6A and 6B are flow charts of an example process for end-to-end identification of erroneous data using machine learning and similarity analysis.

DETAILED DESCRIPTION

Figure 1A:
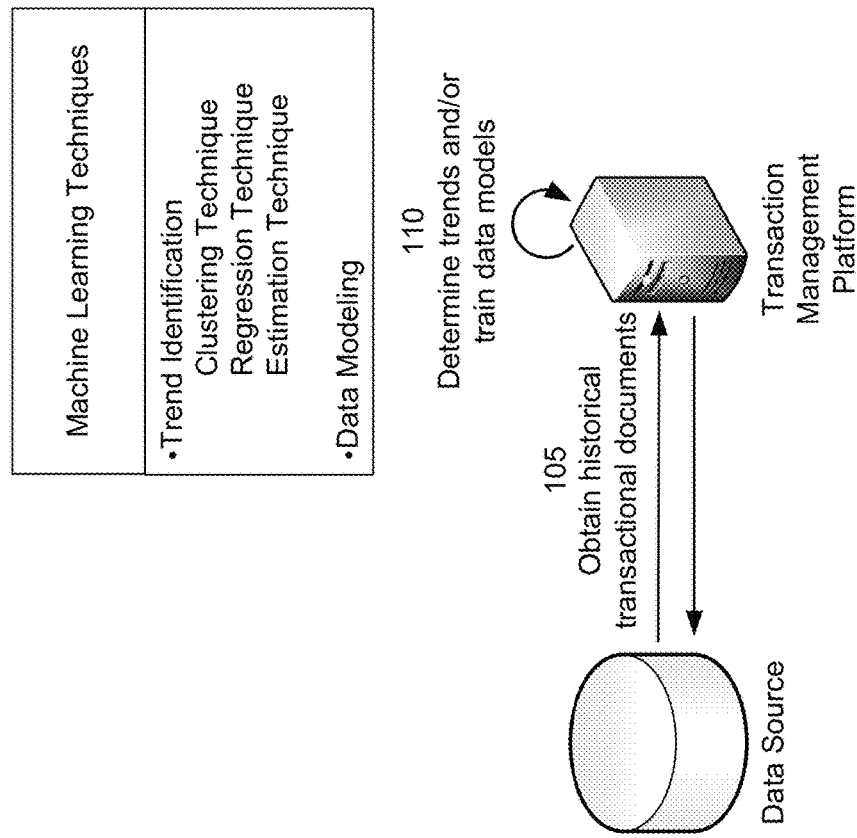
FIGS. 1A-1C are diagrams of an overview of an example implementation described herein.

The following detailed description of example implementations refers to the accompanying drawings. The same reference numbers in different drawings may identify the same or similar elements.

A platform may implement various processes to manage control and visibility over products and/or services throughout a life cycle of data (e.g., a transaction) associated with an entity (e.g., an organization). For example, a platform may implement a process for monitoring receipt of transactions, such as receipt of a transactional document identifying details relating to the transaction (e.g., an invoice), verification of transactions, processing of transactions, execution of transactions, reconciliation and reporting of transactions, error correction associated with the transactions, and/or the like.

In some cases, processing of a transaction between a vendor organization and a client organization may be a time consuming process, which may cause the vendor organization to provide duplicate transactional documents to the client organization to ensure that the transaction is processed in a timely manner. In this case, if a process for managing transactions between the vendor organization and the client organization is unable to detect the duplicate transactional documents (e.g., due to a processing error, a typographical error, etc.), the client organization may erroneously process the same transaction twice. Additionally, in some cases, a sale of a product (e.g., a good, a service, etc.) may involve two or more transactional documents (e.g., a purchasing order and an invoice), and if the process is unable to detect a discrepancy or error included in one of the two or more transactional documents, the client organization may process one of the two or more transactional documents erroneously, which may cause further issues, such as a cancellation, a processing dispute, and/or the like.

Some implementations described herein provide a transaction management platform to generate exceptions identifying problematic transactions and/or duplicate transactions, and to use the exceptions to perform actions associated with correction or prevention of transaction processing errors. For example, the transaction management platform may obtain historical transactional information associated with a set of historical transactions between a client organization and a vendor organization. In this case, the transaction management platform may determine one or more trends associated with values included in the set of historical transactional documents.

The one or more trends may include a first group of trends that identify relationships between historical values and particular transaction processing outcomes (e.g., a historical value may cause or influence an overpayment, a cancellation, a processing dispute, a delivery issue, etc.). Additionally, or alternatively, the one or more trends may include a second group of trends that identify relationships that are not directly related to particular transaction processing outcomes, but that may be used to prevent the particular transaction processing outcomes.

Additionally, the transaction management platform may receive a set of transactional documents between the client organization and the vendor organization. In this case, the transaction management platform may process the set of transactional documents to generate a first set of exceptions indicating that one or more transactional documents, of the set of transactional documents, are problematic transactional documents. The first set of exceptions may be documents, files, error messages, and/or the like, and may include information indicating that one or more transactional documents are problematic transactional documents, information describing why the one or more transactional documents are problematic transactional documents, information indicating whether an exception is a warning or a notification, and/or the like.

Additionally, or alternatively, the transaction management platform may process the set of transactional documents to generate a second set of exceptions. For example, the transaction management platform may use a similarity analysis technique (e.g., a direct matching technique, a fuzzy matching technique, etc.) to generate a second set of exceptions. The second set of exceptions may be documents, files, error messages, and/or the like, and may include information indicating that one or more additional transactional documents are duplicate transactional documents, information describing why the one or more additional transactional documents are duplicate transactional documents, information indicating whether an exception is a warning or a notification and/or the like. In other words, the transaction management platform may process a set of transactional documents to identify an error or fraud within a particular document (e.g., an incorrect transaction value) or a correlation between multiple documents that indicates an error or fraud (e.g., multiple duplicative transactions).

Furthermore, the transaction management platform may generate a set of claims based on the first set of exceptions and/or the second set of exceptions. A claim may be a document verifying that a particular exception is a valid exception. The claim may include information describing why the particular exception was generated, information describing why the particular exception is valid, transactional document information for the particular transactional document, related historical transactional document information, information associated with particular trends, and/or the like. Additionally, the transaction management platform may, based on the set of claims, perform one or more actions associated with correction or prevention of transaction processing errors.

By performing actions to prevent transaction processing errors, the transaction management platform conserves processing resources that might otherwise be used to resolve issues relating to duplicate transactions and/or problematic transactions. Additionally, by performing actions that are preventative or proactive in nature, the transaction management platform conserves processing resources and/or network resources relative to an inferior platform that is only able to resolve issues reactively (e.g., the inferior platform may spend processing resources and/or network resources to execute error correction procedures). Furthermore, by correcting and/or preventing transaction processing errors, the transaction management platform conserves financial resources of the client organization (e.g., by reducing or eliminating processing errors, by reducing or eliminating human resources devoted to managing the processing of transactions, etc.).

Figure 1B:
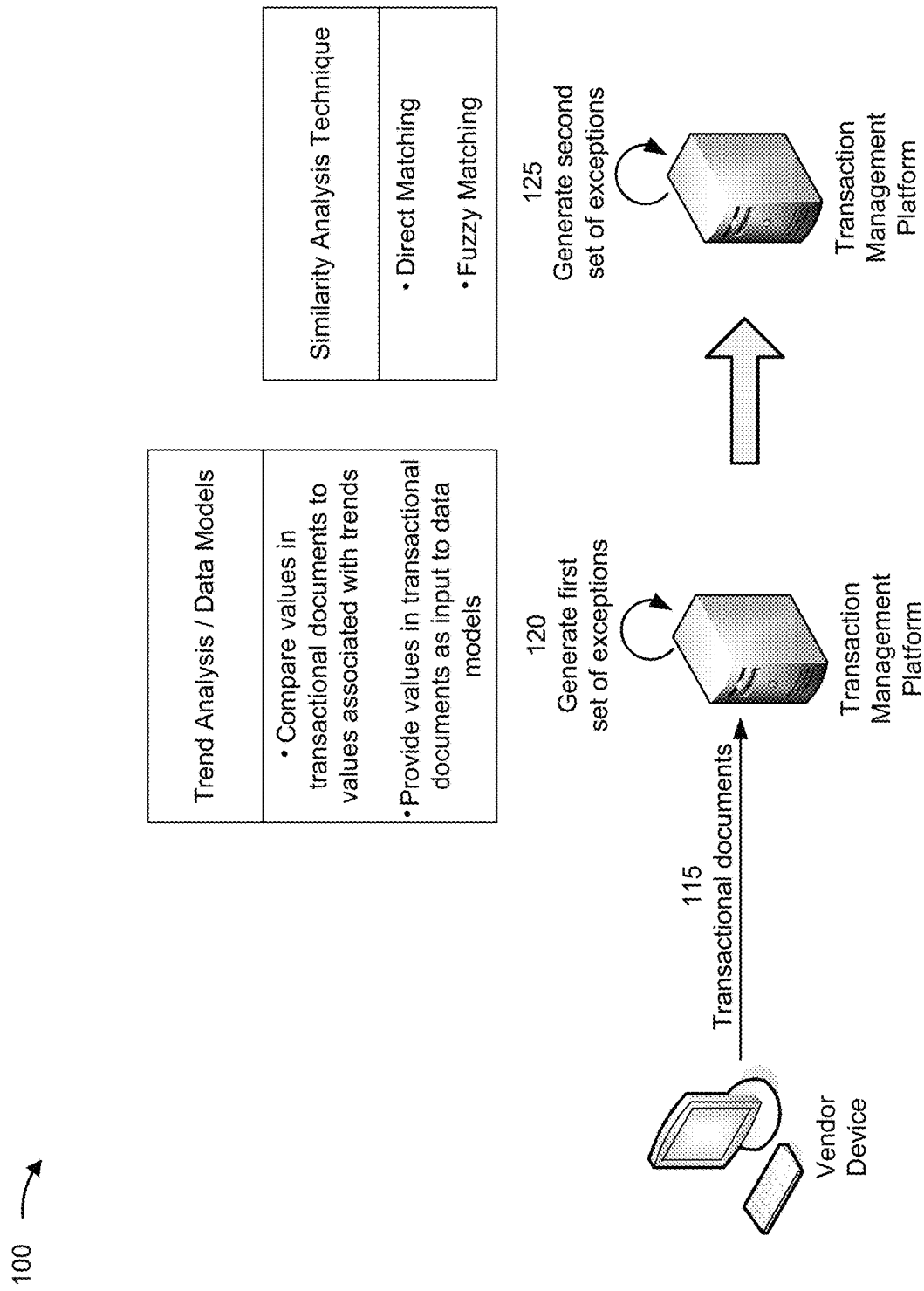
Figure 1C:
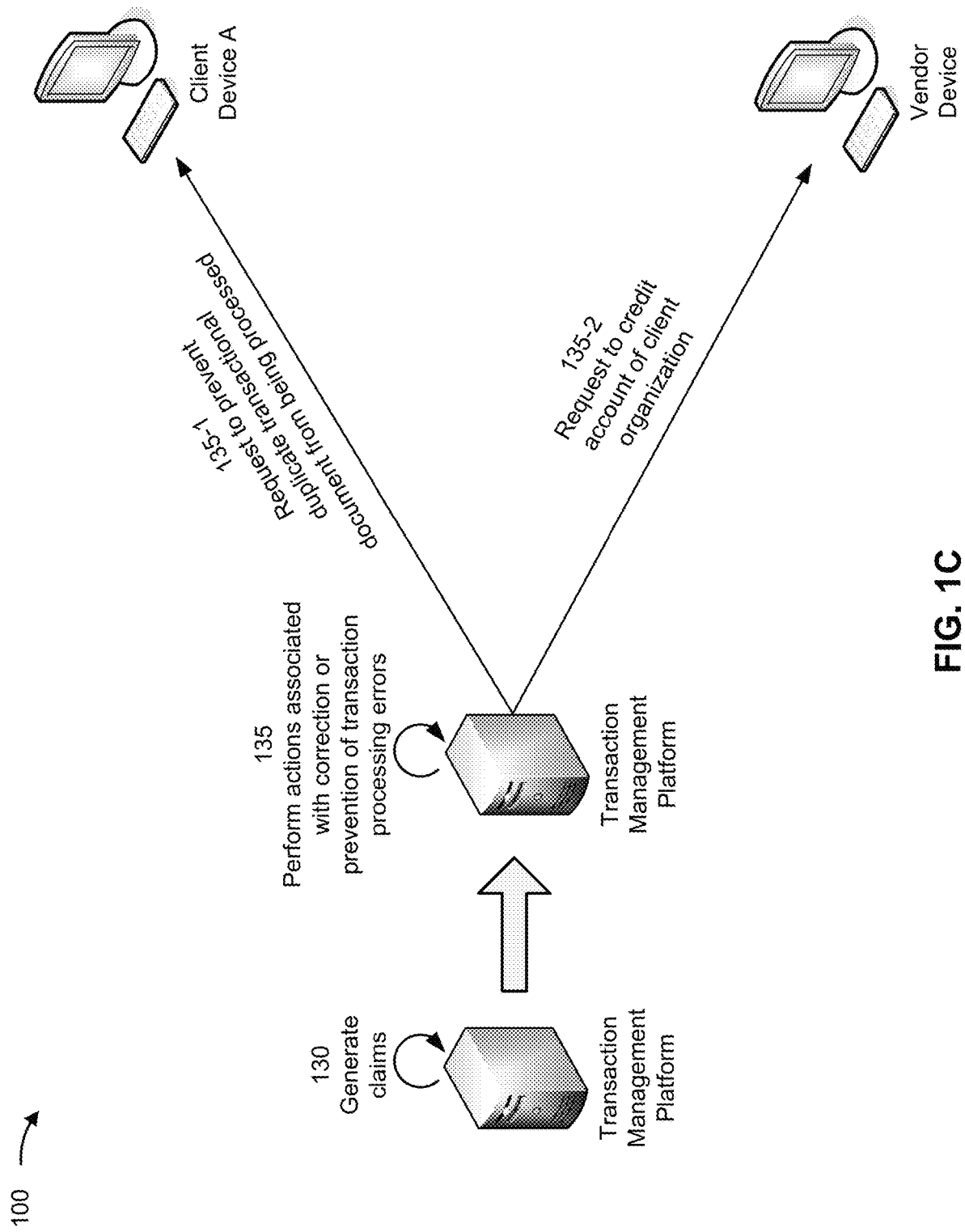

FIGS. 1A-1C are diagrams of an overview of an example implementation 100 described herein. As shown in FIGS. 1A-1C, example implementation 100 may include a transaction management platform to generate exceptions identifying problematic transactions and/or duplicate transactions, and to use the exceptions to perform actions associated with correction or prevention of transaction processing errors.

As shown in FIG. 1A, and by reference number 105, the transaction management platform may obtain a set of historical transactional documents from a data source. The historical transactional information may include transactional information for documents that have already been processed, such as invoices, purchasing orders, inventory-related documents, accounts payable documents, payroll documents, documents relating to the delivery of a product associated with a particular transaction, and/or the like.

Additionally, the historical transactional information may include values included in each transactional document (e.g., a transaction amount, a vendor name, a processing date, etc.), cancellation information indicating whether a cancellation was made, transaction dispute information indicating whether processing of a particular historical transaction was disputed, delivery information indicating whether a delivery of a product associated with a transaction was performed in a timely manner, claim information indicating whether a claim was generated for a particular historical transactional document and any information associated with the claim, and/or the like.

In some implementations, the transaction management platform may process a set of historical transactional documents to obtain values therein. For example, the transaction management platform may perform optical character recognition (OCR) on a document to convert the document to a set of values that can be processed using a machine learning system as described herein. In this case, one functionality of the machine learning system may be to predict whether the optical character recognition was performed correctly. In other words, the transaction management platform may predict errors in optical character recognition based on identifying erroneous values. For example, the machine learning system may identify an erroneous value (e.g., that differs from an expected value, as described herein, as a result of an incorrect character, such as a comma rather than a decimal point or a "1" rather than a "7") and may determine that the erroneous value is a result of an error in optical character recognition. In other words, the machine learning system may determine that optical character recognition incorrectly identified a comma rather than a decimal point or a "1" rather than a "7". In this case, the machine learning system may correct the error in optical character recognition and may provide feedback for performing subsequent optical character recognition, such as by indicating that the optical character recognition should have identified a decimal point or a "7" rather than a comma or a "1", respectively. In this way, the machine learning system, by identifying document errors, can enable retraining of an optical character recognition system, thereby improving optical character recognition performance during subsequent use.

As shown by reference number 110, the transaction management platform may determine one or more trends associated with values included in the historical transactional information and/or may train one or more data models on the historical transactional information. For example, the transaction management platform may determine one or more trends identifying particular historical transactional documents as problematic transactional documents. A problematic transactional document, while defined in detail further herein, may be a transactional document that is likely to cause or influence a particular transaction processing outcome (e.g., an overpayment, a cancellation, etc.). Additionally, the transaction management platform may determine one or more trends by processing the historical transactional information using one or more machine learning techniques, such as a clustering technique, a regression technique, an estimation technique, and/or the like, as each described further herein.

The one or more trends may include a first group of trends that identify relationships between historical values and particular transaction processing outcomes. The first group of trends may associate values included in historical transactional documents with particular transaction processing outcomes by identifying a likelihood of particular values causing or influencing a particular transaction processing outcome, such as a trend indicating that a particular value included in a historical transactional document has a threshold chance of causing the account of the client organization to update erroneously, a threshold chance of causing or influencing a cancellation, a threshold chance of causing or influencing a processing dispute, a threshold chance of causing or influencing a delivery issue, and/or the like, as each described further herein.

Additionally, or alternatively, the one or more trends may include a second group of trends that identify relationships that are not directly related to particular transaction processing outcomes, but that may be further analyzed to prevent particular transaction processing outcomes. The second group of trends may include a trend indicating a time period at which the vendor organization is likely to provide a duplicate transactional document to the client organization, a trend indicating a particular type of error (e.g., a typographical error) that frequently occurs in a particular field of a transactional document, and/or the like.

Additionally, or alternatively, the transaction management platform may train one or more data models on the historical transactional information to identify a particular transactional document's likelihood of being a problematic transactional document. For example, the transaction management platform may train a data model by associating values included in the set of historical transactional documents with configurable values that identify each value's likelihood of being an indicator of a particular historical transactional document being a problematic transactional document. In this way, when the transaction management platform begins to receive new transactional documents (referred to herein as transactional documents), values included in the transactional documents may be scored by the model, as described further herein.

In this way, the transaction management platform is able to determine trends and/or train data models capable of identifying problematic transactional documents.

As shown in FIG. 1B, and by reference number 115, the transaction management platform may receive, from a vendor device, a set of transactional documents. For example, the transaction management platform may receive a set of transactional documents associated with transactions between a client organization and a vendor organization. The set of transactional documents may include any document associated with a transaction between the client organization and the vendor organization, such as an invoice, a purchasing order, an inventory-related document, an accounts payable document, a payroll document, a document relating to the delivery of a product associated with a particular transaction, and/or the like.

As shown by reference number 120, the transaction management platform may generate a first set of exceptions indicating that one or more transactional documents, of the set of transactional documents, are problematic transactional documents. A problematic transactional document may be a transactional document that includes incorrect values, a transactional document that has a threshold chance of causing the account of the client organization to update erroneously, a transactional document that has a threshold chance of being associated with or causing a cancellation, a transactional document that has a threshold chance of being associated with or causing a processing dispute (e.g., a payment dispute), a transactional document that has a threshold chance of being associated with or causing a delivery issue, and/or the like.

The first set of exceptions may be documents, files, error messages, and/or the like, and may include information indicating that one or more transactional documents are problematic transactional documents, information describing why the one or more transactional documents are problematic transactional documents, information indicating whether an exception is a warning or a notification, and/or the like. In some cases, the information describing why a transactional document is a problematic transactional document may be based on one or more values included in the transactional document being similar to one or more values associated with a trend in the set of historical transactional documents. In this case, if a value included in a transactional document satisfies a threshold level of similarity with a value associated with a trend, the transaction management platform may generate an exception.

In some implementations, the transaction management platform may generate an exception based on the one or more trends. For example, the transaction management platform may compare values associated with the one or more trends and one or more values included in the set of transactional documents, and may, based on the comparison, generate a second set of exceptions. A trend may include a predicted value within a transaction document, a predicted change (or lack thereof) in the value over time, a predicted location of a set of transactions, or a predicted relationship between a set of transactions, among other examples described herein.

As an example, assume a trend for a reoccurring transaction includes a static value for a transaction balance, such as $5,000. Further, assume the transaction management platform receives a transactional document for the same reoccurring transaction with a new balance of $50,000. In this case, the transaction management platform may determine that the new balance is a threshold amount above the static balance, which may cause the transaction management platform to generate an exception.

As another example, the transaction management platform may determine that a value in a transaction document deviates from a predicted value in the transaction document by a threshold amount, such as an invoice value differing from a median invoice value by greater than a threshold percentage. In this case, the transaction management platform may flag the transaction document as problematic based on determining that the value deviates from the predicted value by a threshold amount. In some implementations, the transaction management platform may determine a cause of the deviation. For example, as described below, the transaction management platform may determine that the deviation is caused by a data entry error based on an incorrect number in the transaction document being predicted to be a common replacement for a correct number, as determined using artificial intelligence analysis of previous documents with errors. In other words, if a transactional document has a decimal point in a deviant value that, if moved by one numerical position, results in the deviant value being within a predicted range for the value, the transaction management platform may predict that a data entry error resulted in the decimal point being misplaced. Similarly, with reference to the above example, the transaction management platform may determine that a data entry error is associated with an extra "0" digit resulting in a $5,000 recurring transaction balance being recorded as a $50,000 transaction balance in a particular document. Similarly, if a particular invoice is predicted to start with a particular digit (e.g., "5"), but actually starts with a different digit (e.g., "4"), the transaction management platform may predict that the different digit is a result of a typo based on the particular digit and the different digit being positioned close together on a keyboard. As described below, it is contemplated that the transaction management platform may perform the above-mentioned determinations using an artificial intelligence technique that encompasses processing of tens, hundreds, thousands, or millions of features from tens, hundreds, thousands, or millions of documents rather than a single feature (e.g., decimal position or key position) described above for explanation.

In some implementations, the transaction management platform may use a template (or deviation therefrom) to detect an exception. For example, the transaction management platform may receive one or more templates and may identify a set of records matching the one or more templates. In this case, when the templates represent non-erroneous documents, the transaction management platform may flag documents not matching the one or more templates as having an exception. Additionally, or alternatively, when the templates represent examples of documents that have an exception, the transaction management platform may flag documents matching the one or more templates as having an exception.

Additionally, or alternatively, the transaction management platform may generate an exception based on the one or more data models. For example, the transaction management platform may provide one or more values included in a transactional document as input to a data model to cause the data model to output a prediction value indicating a likelihood of the transactional document being a problematic transactional document. If the prediction value indicating the likelihood of the transactional document being a problematic transactional document satisfies a threshold value, then the transaction management platform may generate an exception.

As an example, the transaction management platform may predict that similar transactions with the same vendor, but different vendor address information or tax identification numbers, correlate with fraudulent activities. This may be a type of duplicate invoice fraud. In other words, vendors may enter the same transaction in multiple instances, with different vendor addresses, to attempt to fraudulently obtain multiple payments. In this case, the transaction management platform may analyze transaction documents to determine whether details in the transaction documents correlate with details in other transaction documents, such that the transaction management platform predicts that such a duplicate invoice fraud is occurring. Similarly, the transaction management process may predict that a transaction using a first type of currency corresponds to a transaction using a second type of currency, and may flag a document associated with the first type of currency to verify whether the document is actually to be invoiced with the first type of currency rather than the second type of currency.

As an example of a currency type of fraud, an invoice may have been generated using a first type of currency, but a transaction document is submitted with a second type of currency identified. In this case, the transaction document may appear numerically similar to an expected transaction (e.g., a transaction may be predicted to be for $100, but an invoice may be submitted for £100, which may result in the transaction deviating from the prediction by 10% to 100% depending on a current exchange rate. Accordingly, the transaction management platform may use information regarding historical transaction documents (e.g., information regarding expected currencies for invoices and/or currency exchange rates) to predict whether an invoice submitted for a first type of currency was actually associated with a second type of currency.

As an example of a duplicate invoice type of fraud, multiple duplicate (or near-duplicate) invoices may be submitted based on a single original invoice. In this case, the duplicate (or near-duplicate) invoices may have the same (or similar) transaction values as the single original invoice. However, recurring transactions may result in generation of non-fraudulent duplicate invoices (e.g., each invoice relating to a new, legitimate instance of a recurring transaction). Accordingly, the transaction management platform may use information regarding historical transaction documents (e.g., fraudulent duplicate invoices and non-fraudulent duplicate invoices) to determine whether a duplicate (or near-duplicate invoice) is fraudulent. In this case, the transaction management platform may perform the above-mentioned prediction based on one or more factors, such as whether information in the duplicate invoice correlates with a known type of recurring transaction, whether information in the duplicate invoice has one or more indicia of fraud (e.g., characteristics of a document, such as being generated at abnormal times of day or days of the week or having statistically unlikely changes between an original invoice and a near-duplicate invoice (violations of Benford's law, for example)), or whether information in the duplicate invoice indicates an invoice submitter previously suspected of fraud, among other examples.

As shown by reference number 125, the transaction management platform may generate a second set of exceptions indicating that one or more transactional documents, of the set of transactional documents, are duplicate transactional documents. The second set of exceptions may be documents, files, error messages, and/or the like, and may include information indicating that one or more transactional documents are duplicate transactional documents, information describing why the one or more transactional documents are duplicate transactional documents (e.g., information indicating that a threshold number of values in a first transactional document match corresponding values included in a second transactional document), information indicating whether an exception is a warning or a notification (e.g., a warning that a duplicate transactional document may cause a processing error, a notification that the duplicate transactional document has already caused the processing error, etc.), and/or the like.

In some implementations, the transaction management platform may use a similarity analysis technique to generate a second set of exceptions. For example, the transaction management platform may use a similarity analysis technique (e.g., a direct matching technique, a fuzzy matching technique, etc.) to compare values included in a transactional document to values included in one or more previously received transactional documents, and may generate an exception if the values included in the transactional document satisfy a threshold level of similarity with values included in a previously received transactional document. In this case, the transaction management platform may also identify whether the transactional document has caused an account of the client organization to update erroneously (or if the transactional document is simply capable of causing the account of the client organization to update erroneously).

In this way, the transaction management platform is able to generate exceptions when a problematic transactional document is identified.

As shown in FIG. 1C, and by reference number 130, the transaction management platform may generate a set of claims. For example, the transaction management platform may generate a set of claims based on one or more of the first set of exceptions and one or more of the second set of exceptions.

A claim may be a document verifying that a particular exception is a valid exception. The claim may include information describing why the particular exception was generated, information describing why the particular exception is valid, transactional document information for the particular transactional document, related historical transactional document information, information associated with particular trends, and/or the like. In some cases, the claim may be generated so as to be used for data analytics (e.g., the claim may be used to train a data model).

In some implementations, the transaction management platform may prioritize one or more exceptions. For example, the transaction management platform may prioritize a set of exceptions based on a severity of a detected error (e.g., an amount of money at issue, a priority of a project) and may generate and/or process the set of claims in an order based on the prioritization of the set of exceptions. Because reviews of claims can take long periods of time or use large amounts of computing resources for artificial intelligence claims review, prioritizing the set of exceptions and the claims associated therewith can ensure that high priority claims are processed faster, which reduces a delay in high priority projects. Additionally, it may not be feasible to review all generated claims, so the transaction management platform may prioritize exceptions for review based on a prediction of review time. For example, the transaction management platform may predict a review time for a claim based on historical data regarding the time that has been taken to review similar claims, and may select only a subset of claims for review or for performance of one or more actions, as described below, for which an expected benefit from the claim outweighs an expected cost in time or computing resources. In other words, the transaction management platform may perform an optimization procedure and select a threshold quantity or percentage of claims that are associated with a threshold difference between a benefit and a cost.

As shown by reference number 135, the transaction management platform may perform one or more actions associated with correction or prevention of transaction processing errors. For example, assume a particular claim indicates that a duplicate transactional document is capable of causing the account of the client organization to update erroneously (e.g., a duplicate payment has not been made, but is capable of being made as a result of the client organization receiving the duplicate transactional document). In this case, and as shown by reference number 135-1, the transaction management platform may provide, to a client device (shown as Client Device A), a request to prevent the duplicate transactional document from being processed (e.g., a request for a stop payment).

As another example, assume a particular claim indicates that a duplicate transactional document has caused the account of the client organization to update erroneously (e.g., a duplicate payment was made prior to identification of the duplicate transactional document). In this case, and as shown by reference number 135-2, the transaction management platform may provide, to a vendor device, a request to credit the account of the client organization.

In some implementations, the transaction management platform may perform additional actions, such as one or more actions associated with reducing a likelihood of a transactional document causing or influencing a cancellation, one or more actions associated with reducing a likelihood of a transactional document causing or influencing a processing dispute, one or more actions associated with reducing a likelihood of a transactional document causing or influencing a delivery issue, and/or the like, as each described further herein. Furthermore, in some cases, the vendor organization may offer a discount if a particular transactional document is processed before a discount deadline, and the transaction management platform may generate scheduling information for the particular transactional document to ensure that the particular transactional document is processed before the discount deadline.

In this way, the transaction management platform is able to prevent and/or correct transaction processing errors. Furthermore, the transaction management platform conserves processing resources that might otherwise be used to resolve issues relating to duplicate transactions and/or problematic transactions.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100.

Figure 2:
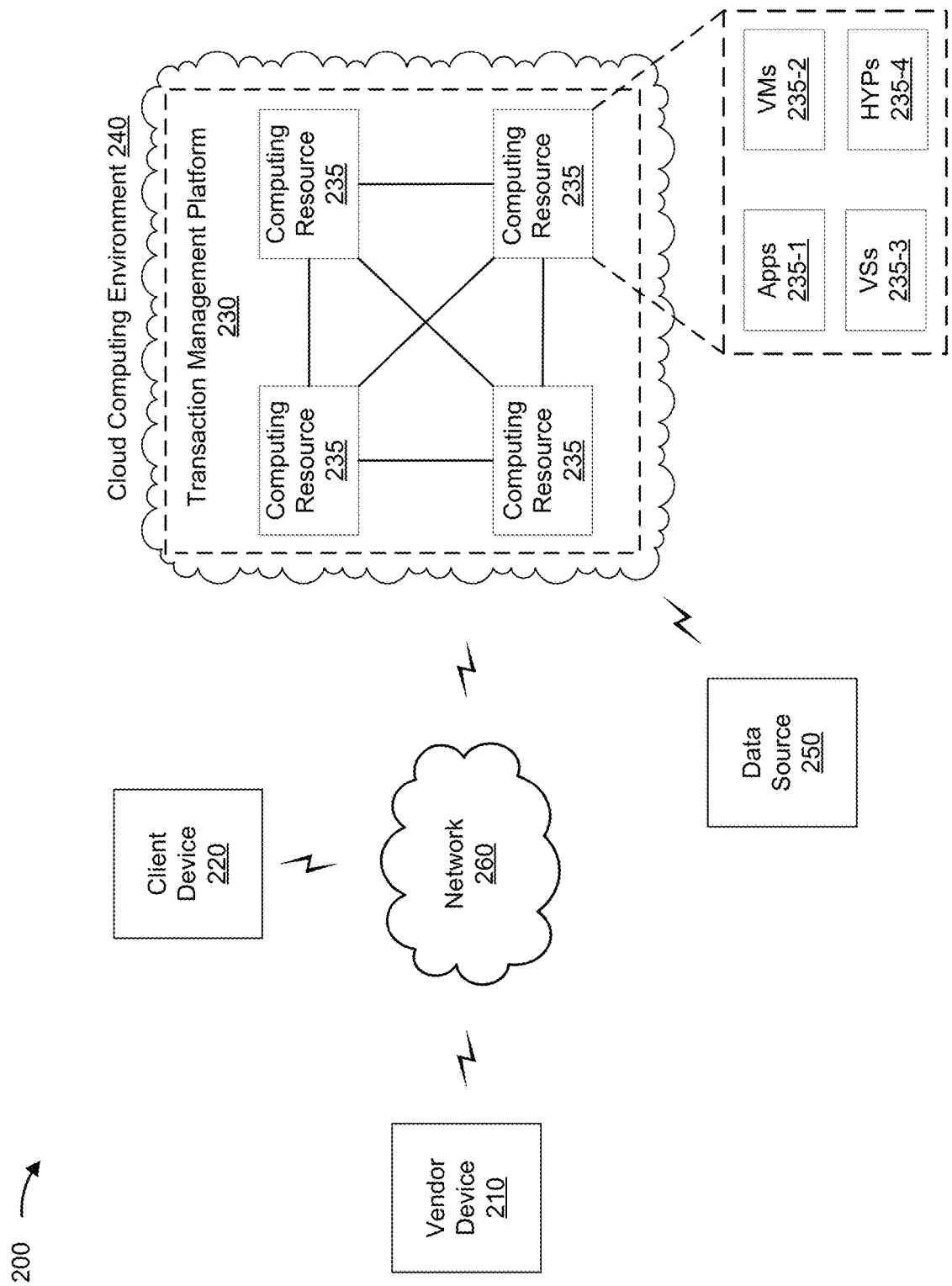
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include a vendor device 210, a client device 220, a transaction management platform 230 hosted by a cloud computing environment 240, a data source 250, and/or a network 260. Devices of example environment 200 may interconnect via wired connections, wireless connections, or a combination of connections.

Vendor device 210 includes one or more devices capable of receiving, generating, storing, processing, and/or providing information associated with a set of transactional documents. For example, vendor device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, vendor device 210 may be a device accessible to an employee of the vendor organization, such as a communication and/or computing device accessible to a supply chain manager, a sales representative, a delivery manager, and/or the like. In some implementations, vendor device 210 may provide a set of transactional documents to transaction management platform 230. In some implementations, vendor device 210 may receive a request to credit an account of a client organization from transaction management platform 230 or client device 220. In some implementations, vendor device 210 may receive a request to update incorrect transactional document information from transaction management platform or client device 220.

Client device 220 includes one or more devices capable of receiving, generating, storing, processing, and/or providing information associated with a set of exceptions. For example, client device 220 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, client device 220 may be a device accessible to an employee of the client organization, such as a communication and/or computing device accessible to a supply chain manager, a sales representative, a delivery manager, and/or the like. In some implementations, client device 220 may receive a set of exceptions from transaction management platform 230. In some implementations, client device 220 may generate the set of exceptions, and may provide the set of exceptions to transaction management platform 230.

Transaction management platform 230 includes one or more devices capable of receiving, storing, generating, processing, and/or providing information associated with a set of transactional documents. For example, transaction management platform 230 may include a server device (e.g., a host server, a web server, an application server, etc.), a data center device, or a similar device.

In some implementations, transaction management platform 230 may interact with one or more devices described herein using an application programming interface (API). For example, transaction management platform 230 may provide, to vendor device 210 and/or client device 220, a recommended action associated with reducing a likelihood of a transactional document causing or influencing a cancellation, a processing dispute, a delivery issue, and/or the like.

In some implementations, as shown, transaction management platform 230 may be hosted in cloud computing environment 240. Notably, while implementations described herein describe transaction management platform 230 as being hosted in cloud computing environment 240, in some implementations, transaction management platform 230 might not be cloud-based (i.e., may be implemented outside of a cloud computing environment) or might be partially cloud-based.

Cloud computing environment 240 includes an environment that hosts transaction management platform 230. Cloud computing environment 240 may provide computation, software, data access, storage, and/or other services that do not require end-user knowledge of a physical location and configuration of system(s) and/or device(s) that host transaction management platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host transaction management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by vendor device 210 and/or client device 220. Application 235-1 may eliminate a need to install and execute the software applications on vendor device 210 and/or client device 220. For example, application 235-1 may include software associated with transaction management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., vendor device 210 and/or client device 220), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Data source 250 includes one or more devices capable of receiving, storing, processing, and/or providing information associated with historical transactional documents. For example, data source 250 may include a server device, a group of server devices, a camera, a sensor, and/or the like. In some implementations, data source 250 may store historical transactional documents that may be provided to transaction management platform 230 (e.g., to allow transaction management platform 230 to use the historical transactional documents to determine trends and/or to train data models).

In some implementations, data source 250 may be a sensor that is located near a physical location where an employee of a vendor organization or a client organization is to input values into a particular transactional document (e.g., a physical paper copy of a transactional document). In this case, data source 250 may monitor the particular transactional document as the particular transactional document is being filled out by a user (e.g., a user may input values into fields of the particular transactional document). Additionally, data source 250 may capture the values being input into the particular transactional document (e.g., by taking a screenshot of the particular transactional document, by recording a user who says the input values out loud, etc.). Furthermore, data source 250 may provide the information being input into the particular transactional document to transaction management platform 230 for further processing.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
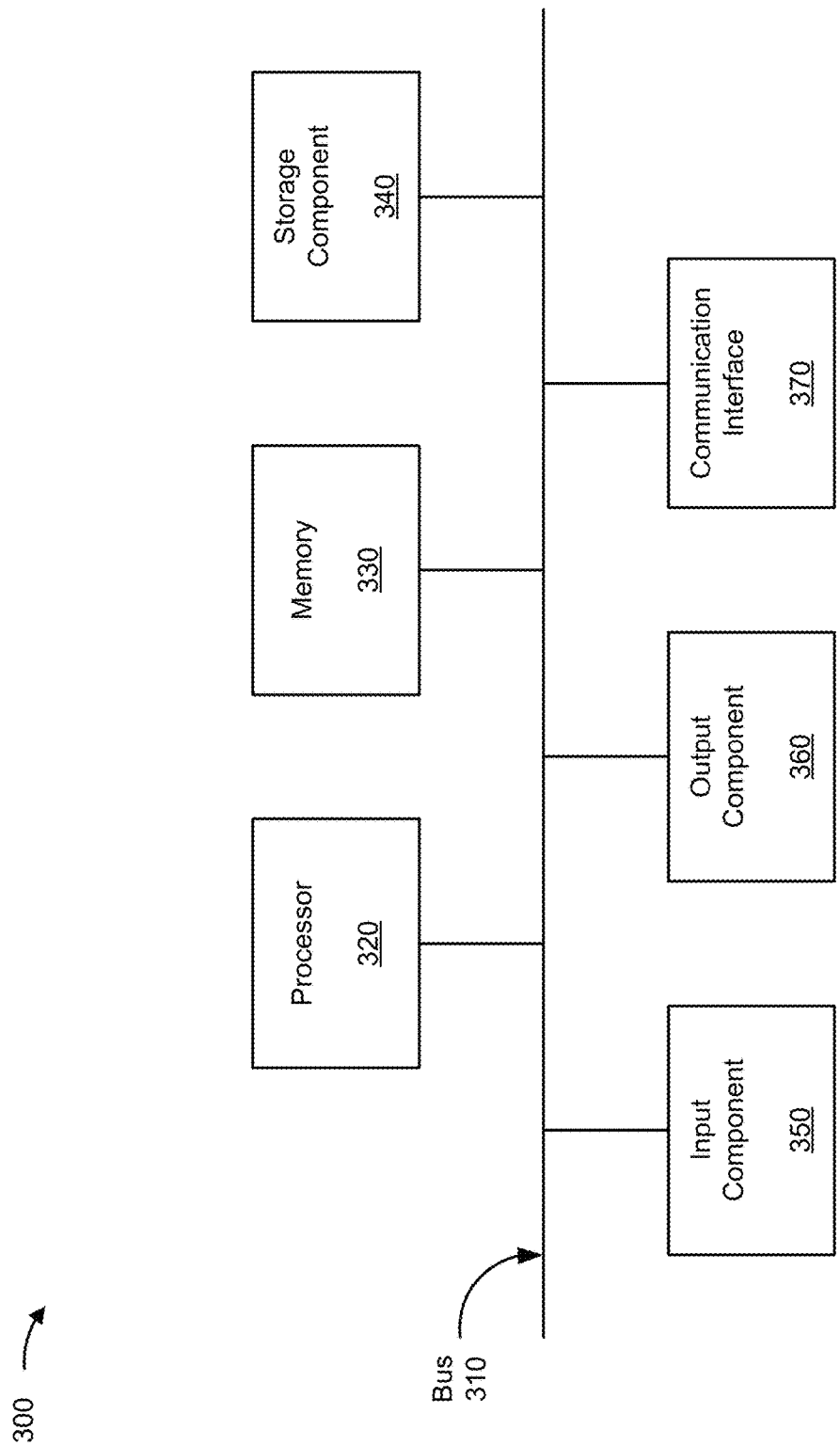
FIG. 3 is a diagram of example components of one or more devices of FIG. 2.

FIG. 3 is a diagram of example components of a device 300. Device 300 may correspond to vendor device 210, client device 220, transaction management platform 230, and/or data source 250. In some implementations, vendor device 210, client device 220, transaction management platform 230, and/or data source 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
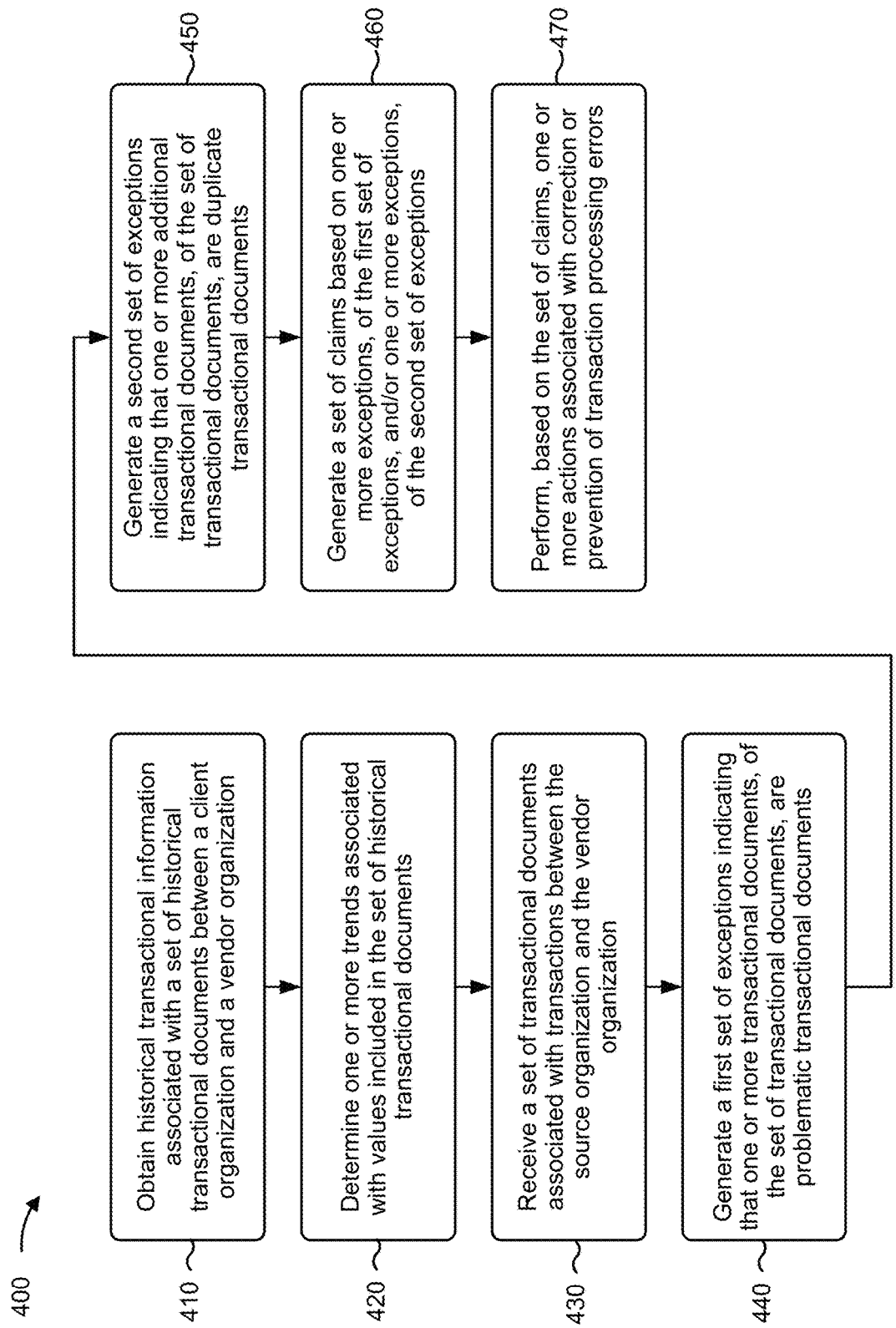
FIG. 4 is a flow chart of an example process for generating exceptions that identify problematic transactions and/or duplicate transactions and using the exceptions to perform one or more actions associated with correction or prevention of transaction processing errors.

FIG. 4 is a flow chart of an example process 400 for generating exceptions that identify duplicate transactions and/or problematic transactions and using the exceptions to perform one or more actions associated with correction or prevention of transaction processing errors. In some implementations, one or more process blocks of FIG. 4 may be performed by transaction management platform 230. In some implementations, one or more process blocks of FIG. 4 may be performed by another device or a group of devices separate from or including transaction management platform 230, such as vendor device 210, client device 220, and/or data source 250.

As further shown in FIG. 4, process 400 may include obtaining historical transactional information associated with a set of historical transactional documents between a client organization and a vendor organization (block 410). For example, transaction management platform 230 (e.g., computing resource 235, processor 320, memory 330, storage component 340, etc.) may obtain, from data source 250, historical transactional information associated with a set of historical transactional documents.

In some implementations, data source 250 may store historical transactional information. For example, data source 250 may store the historical transactional information using a data structure, such as a linked-list, an array, a tree, a graph, a database, and/or the like. The set of historical transactional documents may include any document associated with a transaction between the client organization and the vendor organization, such as an invoice, a purchasing order, an inventory-related document, an accounts payable document, a payroll document, a document relating to the delivery of a product associated with a particular transaction, and/or the like.

In some implementations, transaction management platform 230 may obtain historical transactional information from data source 250. For example, transaction management platform 230 may search (e.g., query) data source 250 to obtain historical transactional information (e.g., in bulk, periodically over an interval, etc.). In some implementations, data source 250 may be configured to automatically provide the historical transactional information to transaction management platform 230 (e.g., in bulk, periodically over the interval, etc.).

In this way, transaction management platform 230 is able to obtain historical transactional information associated with a set of historical transactional documents between a client organization and a vendor organization.

As further shown in FIG. 4, process 400 may include determining one or more trends associated with values included in the set of historical transactional documents (block 420). For example, transaction management platform 230 (e.g., computing resource 235, processor 320, memory 330, storage component 340, etc.) may process the historical transactional information to determine one or more trends identifying particular historical transactional documents as problematic transactional documents. In this way, the one or more trends may be used to flag transactional documents (e.g., new incoming transactional documents) as problematic transactional documents, as described further herein. Additionally, or alternatively, transaction management platform 230 may train one or more data models to identify a particular transactional document's likelihood of being a problematic transactional document.

The one or more trends may include a first group of trends that identify relationships between historical values and particular transaction processing outcomes. The first group of trends may associate values included in historical transactional documents with particular transaction processing outcomes by identifying a likelihood of particular values causing or influencing a particular transaction processing outcome, such as a trend indicating that a particular value included in a historical transactional document has a threshold chance of causing the account of the client organization to update erroneously, a threshold chance of causing or influencing a cancellation, a threshold chance of causing or influencing a processing dispute, a threshold chance of causing or influencing a delivery issue, and/or the like, as each described further herein.

Additionally, or alternatively, the one or more trends may include a second group of trends that identify relationships that are not directly related to particular transaction processing outcomes, but that may be further analyzed to prevent particular transaction processing outcomes. The second group of trends may include a trend indicating a time period at which the vendor organization is likely to provide a duplicate transactional document to the client organization, a trend indicating a particular type of error (e.g., a typographical error) that frequently occurs in a particular field of a transactional document, and/or the like.

In some implementations, transaction management platform 230 may determine one or more trends associated with the values included in the set of historical transactional documents. For example, transaction management platform 230 may determine one or more trends by processing the historical transactional information using one or more machine learning techniques, such as a clustering technique (e.g., a K-means clustering technique), a regression technique (e.g., a logistic regression technique), an estimation technique (e.g., a Bayesian estimation technique), and/or the like.

As an example, transaction management platform 230 may use an estimation technique to determine a trend indicating that one or more values included in the set of historical transactional documents having a threshold chance of causing or influencing the account of the client organization to update erroneously. In this example, transaction management platform 230 may determine, for a particular field included in multiple historical transactional documents, processing statistics associated with the particular field (e.g., an average value, a minimum value, a maximum value, a value that is an outlier from the average value, etc.).

Additionally, transaction management platform 230 may compare the processing statistics to claim information indicating which historical transactional documents, of the set of historical transactional documents, were associated with the account of the client organization updating erroneously, to determine a trend indicating that particular values are likely to have caused or influenced the account of the client organization to update erroneously. As a specific example, there may be a reoccurring typographical error in an invoice that causes an incorrect value to be charged to the client organization.

As another example, transaction management platform 230 may use a regression technique to determine a trend associated with a cancellation of a particular type of historical transactional document. For example, transaction management platform 230 may identify a trend indicating that a first historical transactional document (e.g., an invoice) has a threshold chance of causing a cancellation of an order if there is a discrepancy in a particular value between the first historical transactional document and a second historical transactional document (e.g., a purchasing order), a trend indicating that historical transactional documents that postpone processing are a threshold degree more likely to be cause or be associated with a cancellation (relative to transactional documents that do not postpone processing), a trend indicating that the higher (or lower) the transaction amount value, the more likely or less likely a historical transactional document is to be associated with a cancellation, a trend indicating that a particular type of historical transactional document is more likely to be associated with a cancellation than similar types of historical transactional documents, and/or the like.

As another example, transaction management platform 230 may use a regression technique or estimation technique to determine a trend associated with a processing dispute for a particular historical transactional document. For example, transaction management platform 230 may identify a trend indicating that an error or a discrepancy in a particular type of historical transactional document is likely to cause a processing dispute, a trend indicating that an error or discrepancy associated with a field or type of value included in a historical transactional document is likely to cause a processing dispute, a trend indicating that a discrepancy between a first historical transactional document (e.g., a purchasing order) and a second historical transactional document (e.g., an invoice) is likely to cause a processing dispute, and/or the like.

As another example, transaction management platform 230 may use a regression technique or estimation technique to determine a trend associated with a delivery issue for a product or service relating to the particular historical transactional document. For example, transaction management platform 230 may identify a trend indicating that an error or a discrepancy in a particular type of historical transactional document or a particular value included in a historical transactional document is likely to cause a delivery issue (e.g., a missing or incorrect value may delay processing which may cause a vendor organization to hold delivery of a product), a trend indicating that an error or discrepancy between a first transactional document and a second transactional document is likely to cause a delivery issue, and/or the like.

As another example, transaction management platform 230 may use a regression technique, such as a logistic regression technique, to determine a trend indicating a time period at which the vendor organization is likely to provide a duplicate transactional document. In this example, transaction management platform 230 may use the regression technique to process date values identifying a time period at which each historical transactional document was provided to the client organization.

Additionally, transaction management platform 230 may use the regression technique to determine, for each historical transactional document or for each type of historical transactional document, a rule that may be used to determine the time period at which the vendor organization is likely to provide the duplicate transactional document. As an example, a vendor organization may provide an invoice to the client organization, where the invoice has to be paid within thirty days. The vendor organization may also provide a duplicate invoice (e.g., as a reminder) to the client organization exactly fifteen days after sending the original invoice.

Additionally, or alternatively, transaction management platform 230 may train a data model based on the historical transactional information. For example, transaction management platform 230 may train a data model by associating values included in the set of historical transactional documents with configurable values that identify each value's likelihood of being an indicator of a particular historical transactional document being a problematic transactional document. In this way, when transaction management platform 230 begins to receive new transactional documents, values included in the new transactional documents may be scored by the model, as described further herein.

As an example, if a particular recurring typographical error often led to a processing dispute between the client organization and the vendor organization, transaction management platform 230 may train a data model that associates the particular recurring typographical error with a configurable value indicating that a particular historical transactional document is likely to be a problematic transactional document.

As another example, if a trend indicates that a particular value included in a historical transactional document caused or influenced a particular transaction processing outcomes, then transaction management platform 230 may train a data model to associate the particular value with a configurable value indicating that the historical transactional document is likely to be a problematic transactional document.

In this way, transaction management platform 230 is able to determine one or more trends associated with values included in the set of historical transactional documents and/or is able to train data models that identify a particular transactional document's likelihood of being a problematic transactional document.

As further shown in FIG. 4, process 400 may include receiving a set of transactional documents associated with transactions between the client organization and the vendor organization (block 430). For example, transaction management platform 230 (e.g., computing resource 235, processor 320, memory 330, storage component 340, etc.) may receive, from vendor device 210, a set of transactional documents associated with transactions between the client organization and the vendor organization. The set of transactional documents may include any document associated with a transaction between the client organization and the vendor organization, such as an invoice, a purchasing order, an inventory-related document, an accounts payable document, a payroll document, and/or the like.

In some implementations, transaction management platform 230 may receive a set of transactional documents from vendor device 210. For example, transaction management platform 230 may receive a set of transactional documents periodically (e.g., once a day, once an hour, once per threshold time period, etc.). Additionally, transaction management platform 230 may receive the set of transactional documents via a secure medium (e.g., using a secure file transfer protocol (SFTP)).

In this way, transaction management platform 230 is able to receive a set of transactional documents associated with transactions between the client organization and the vendor organization.

As further shown in FIG. 4, process 400 may include generating a first set of exceptions indicating that one or more transactional documents, of the set of transactional documents, are problematic transactional documents (block 440). For example, transaction management platform 230 (e.g., computing resource 235, processor 320, memory 330, storage component 340, communication interface 370, etc.) may generate a first set of exceptions based on the one or more trends and/or the one or more data models.

The first set of exceptions may be documents, files, error messages, and/or the like, and may include information indicating that one or more transactional documents are problematic transactional documents, information describing why the one or more transactional documents are problematic transactional documents, information indicating whether an exception is a warning or a notification, and/or the like. In some cases, the information describing why a transactional document is a problematic transactional document may be based on one or more values included in the transactional document being similar to one or more values associated with a trend in the set of historical documents. In this case, if a value included in a transactional document satisfies a threshold level of similarity with a value associated with a trend, transaction management platform 230 may generate an exception.

As an example, the first set of exceptions may include a first exception to flag a transactional document as having a threshold chance of causing the account of the client organization to update erroneously, a second exception to flag the transactional document as having a threshold chance of including incorrect values, a third exception to flag the transactional document as having a threshold chance of causing or influencing a cancellation, a fourth exception to flag the transactional document as having a threshold chance of causing or influencing a processing dispute, a fifth exception to flag the transactional document as having a threshold chance of causing or influencing a delivery issue, and/or the like.

A problematic transactional document may be a transactional document that includes incorrect values, a transactional document that has a threshold chance of causing the account of the client organization to update erroneously, a transactional document that has a threshold chance of being associated with or causing a cancellation, a transactional document that has a threshold chance of being associated with or causing a processing dispute, a transactional document that has a threshold chance of being associated with or causing a delivery issue, and/or the like.

In some implementations, transaction management platform 230 may generate an exception by using the one or more trends to process the transactional information included in the set of transactional documents. For example, transaction management platform 230 may compare one or more values included in a particular transactional document, of the set of transactional documents, and one or more values associated with a trend. In this case, transaction management platform 230 may determine that a value, of the one or more values included in the particular transactional document, satisfies a threshold level of similarity with the one or more values associated with the trend. In this way, transaction management platform 230 is able to use the trend to generate an exception indicating that the transactional document is a problematic transactional document.

As an example, assume the client organization and the vendor organization engage in a reoccurring sale of a product, wherein thousands of sales are made annually. Further assume that in some cases, a first historical transactional document (e.g., a purchasing order) occasionally includes a payment amount due field that is different than a second historical transactional document (e.g., an invoice). Additionally, transaction management platform 230 may determine a trend indicating that the discrepancy in the payment amount due field caused a payment dispute between the client organization and the vendor organization. Furthermore, transaction management platform 230 may process a first transactional document (e.g., a new incoming purchasing order for the same product) and a second transactional document (e.g., a new incoming invoice for the same product) to determine whether the payment amount field in the first transactional document matched the payment amount field in the second transactional document, and may generate an exception if the payment amount field does not match.

Additionally, or alternatively, transaction management platform 230 may use one or more data models to generate an exception. For example, transaction management platform 230 may provide one or more values included in a transactional document, of the set of transactional documents, as input to a data model to cause the data model to output a prediction value indicating a likelihood of the transactional document being a problematic transactional document. If the prediction value indicating the likelihood of the transactional document being a problematic transactional document satisfies a threshold value, then transaction management platform 230 may generate an exception.

In some cases, transaction management platform 230 may generate the first set of exceptions by processing a quantity of data that may not be processed objectively by a human actor. For example, transaction management platform 230 may process tens of thousands, hundreds of thousands, or even millions of transactional documents in real-time, which may include millions, billions, or more, of different types of values included in the transactional documents. In this way, transaction management platform 230 is able to generate the first set of exceptions by processing a quantity of data that is unable to be processed objectively by a human actor.

In this way, transaction management platform 230 is able to generate a first set of exceptions indicating that one or more transactional documents are problematic transactional documents.

As further shown in FIG. 4, process 400 may include generating a second set of exceptions indicating that one or more additional transactional documents, of the set of transactional documents, are duplicate transactional documents (block 450). For example, transaction management platform 230 (e.g., computing resource 235, processor 320, memory 330, storage component 340, etc.) may generate a second set of exceptions indicating that one or more additional transactional documents are duplicate transactional documents by using a similarity analysis technique (e.g., a direct matching technique, a fuzzy matching technique, etc.) to analyze the set of transactional documents.

The second set of exceptions may be documents, files, error messages, and/or the like, and may include information indicating that one or more transactional documents are duplicate transactional documents, information describing why the one or more transactional documents are duplicate transactional documents (e.g., information indicating that a threshold number of values in a first transactional document match corresponding values included in a second transactional document), information indicating whether an exception is a warning or a notification (e.g., a warning that a duplicate transactional document may cause a processing error, a notification that the duplicate transactional document has already caused the processing error, etc.), and/or the like.

In some implementations, transaction management platform 230 may use a direct matching technique to generate an exception. For example, transaction management platform 230 may compare a first additional transactional document, of the set of transactional documents, to a second additional transactional document, of the set of transactional documents, and may generate an exception if one or more values included in a first additional transactional document match corresponding values that are included in the second additional transactional document.

As an example, assume transaction management platform 230 stores matching criteria for an invoice document that includes an invoice number field, an invoice date field, an invoice amount field, and a vendor number field. In this case, transaction management platform 230 may compare an invoice number field, an invoice date field, an invoice amount field, and a vendor number field included in a first invoice with the same fields included in a second invoice. If the matching criteria is satisfied (i.e., if the fields match), transaction management platform 230 may generate an exception to indicate that the second invoice is a duplicate transactional document.

Additionally, or alternatively, transaction management platform 230 may use a fuzzy matching technique to generate an exception. For example, transaction management platform 230 may use a fuzzy matching technique to compare particular fields included in a first additional transactional document with particular fields included in a second additional transactional document. In this case, transaction management platform 230 may generate an exception if a threshold number of characters in one or more fields of the first additional transactional document match one or more characters in a corresponding one or more fields of the second additional transactional document. In this way, transaction management platform 230 is able to identify duplicate transactions in situations where the documents are not a direct match (e.g., due to a typographical error, a discrepancy in a value of a particular field, etc.).

In some cases, transaction management platform 230 may generate the second set of exceptions by processing a quantity of data that may not be processed objectively by a human actor. For example, transaction management platform 230 may process tens of thousands, hundreds of thousands, even millions of additional transactional documents in real-time, which may include millions, billions, or more, of different types of values included in the additional transactional documents. In this way, transaction management platform 230 is able to generate the second set of exceptions by processing a quantity of data that is unable to be processed objectively by a human actor.

In this way, transaction management platform 230 is able to generate a second set of exceptions indicating that one or more transactional documents are duplicate transactional documents.

As further shown in FIG. 4, process 400 may include generating a set of claims based on one or more exceptions, of the first set of exceptions, and/or one or more exceptions, of the second set of exceptions (block 460). For example, transaction management platform 230 may (e.g., computing resource 235, processor 320, memory 330, storage component 340, communication interface 370, etc.) execute a verification procedure to verify each claim, of the first set of claims and/or of the second set of claims, and may generate a set of claims that include each exception that has been verified.

A claim may be a document verifying that a particular exception is a valid exception. The claim may include information describing why the particular exception was generated, information describing why the particular exception is valid, transactional document information for the particular transactional document, related historical transactional document information, information associated with particular trends, and/or the like. In some cases, the claim may be generated so as to be used for data analytics (e.g., the claim may be used to train a data model).

As an example, a claim may include information indicating that a particular exception, of the first set of exceptions, was generated because one or more values in a second transactional document matched one or more corresponding values in a first transactional document. The claim may also include information describing why the particular exception is valid. For example, a user may manually compare the first transactional document and the second transactional document to confirm that the second transactional document is in fact a duplicate of the first transactional document. Additionally, the claim may include related historical transactional document information and/or information associated with particular trends that were used to generate the particular exception.

In some implementations, transaction management platform 230 may automatically generate the set of claims. For example, transaction management platform 230 may execute a verification procedure on each exception, of the first set of exceptions and/or the second set of exceptions, to verify which exceptions are accurate. In this case, the verification procedure may include comparing the values associated with an exception to a verification threshold that is based on historical exceptions that have previously been confirmed to be accurate.

Additionally, or alternatively, client device 220 may generate the set of claims. For example, transaction management platform 230 may provide, to client device 220, the first set of exceptions and/or the second set of exceptions. In this case, a user may interact with an interface of client device 220 to view the first set of exceptions and/or the second set of exceptions, and may manually verify which exceptions are accurate (and are to be used to generate claims). Furthermore, client device 220 may provide the set of exceptions to transaction management platform 230 to allow transaction management platform 230 to perform one or more actions associated with correction or prevention of transaction processing errors, as described below.

In this way, transaction management platform 230 is able to generate a set of claims.

As further shown in FIG. 4, process 400 may include performing, based on the set of claims, one or more actions associated with correction or prevention of transaction processing errors (block 470). For example, transaction management platform 230 (e.g., computing resource 235, processor 320, memory 330, storage component 340, communication interface 370, etc.) may, based on the set of claims, perform one or more actions associated with preventing a duplicate transactional document from being processed, perform one or more actions associated with requesting a credit to the account of the client organization, perform one or more actions associated with reducing a likelihood of a transactional document causing or influencing a cancellation, perform one or more actions associated with reducing a likelihood of a transactional document causing or influencing a processing dispute, perform one or more actions associated with reducing a likelihood of a transactional document causing or influencing a delivery issue, and/or the like, as each described further herein.

A transaction processing error may include processing of a duplicate transactional document (e.g., which may cause the client organization to pay twice for the same product or service), a processing error that causes or influences a cancellation, a processing error that causes or influences a processing dispute, a processing error that causes of influences a delivery issue (e.g., relating to a product or service associated with a particular transactional document), and/or the like.

In some implementations, transaction management platform 230 may perform one or more actions associated with preventing a duplicate transactional document from being processed. For example, assume transaction management platform 230 generates a claim for an exception indicating that a particular transactional document is a duplicate transactional document that is capable of causing the account of the client organization to update erroneously. In this case, transaction management platform 230 may generate a request to prevent the particular transactional document from being processed. Additionally, transaction management platform 230 may provide the request to client device 220 to allow the client device 220 to stop the particular transactional document from being processed. In some cases, transaction management platform 230 may automatically stop the particular transactional document from being processed.

Additionally, or alternatively, transaction management platform 230 may perform one or more actions associated with requesting a credit to the account of the client organization. For example, assume transaction management platform 230 generates a claim for an exception indicating that a particular transactional document is a duplicate transactional document that has caused the account of the client organization to update erroneously. In this case, transaction management platform 230 may generate a request to credit the account of the client organization (e.g., a request for a refund). Additionally, transaction management platform 230 may provide the request to vendor device 210 to allow vendor device 210 to credit the account of the client organization (e.g., by providing the refund).

Additionally, or alternatively, transaction management platform 230 may perform one or more actions associated with reducing a likelihood of a transactional document causing or influencing a cancellation, a processing dispute, and/or a delivery issue. For example, assume transaction management platform 230 generates a claim for an exception that flags a transactional document as having a threshold chance of being associated with or causing a cancellation, a processing dispute, and/or a delivery issue. Further assume the transactional document is an invoice, and includes discrepancies in values (e.g., as compared to a corresponding purchasing order, as compared to previous invoices relating to the same reoccurring transaction or similar transactions, etc.).

In this case, transaction management platform 230 may generate a recommendation that includes resolution information. The resolution information may include actions that may reduce a likelihood of a transactional document causing or influencing a cancellation, a processing dispute, a delivery dispute, and/or the like. For example, the resolution information may include vendor contact information (e.g., which device or party to contact to begin to resolve a particular issue), instructions on how to resolve the issue (e.g., update the transactional document to correct an error, contact the vendor organization to request that the vendor organization correct the error, etc.), and/or the like. Additionally, transaction management platform 230 may provide the recommendation to vendor device 210 and/or client device 220.

Additionally, or alternatively, transaction management platform 230 may automatically perform one or more actions to reduce the likelihood of the transactional document causing or influencing the cancellation, the processing dispute, and/or the delivery issue. For example, transaction management platform 230 may compare one or more values identified in a flagged transactional document to one or more corresponding values included in the set of historical transactional documents. The one or more corresponding values may be associated with a trend and may be used as replacement values. In this case, transaction management platform 230 may generate an updated transactional document that includes the one or more corresponding values. Additionally, transaction management platform 230 may provide the updated transactional document to client device 220.

As another example, transaction management platform 230 may compare one or more discrepancies identified in the transactional document to a master transactional document. The master transactional document may include verified values that are to be included in a flagged transactional document. In this case, transaction management platform 230 may generate an updated transactional document based on values included in the master transactional document. Additionally, transaction management platform 230 may provide the updated transactional document to vendor device 210 and/or client device 220.

Additionally, or alternatively, transaction management platform 230 may generate summary statistics associated with the set of claims. For example, transaction management platform 230 may process the set of claims to generate summary statistics, such as a total number of transactional documents processed over a time period, a total number of exceptions identified over the time period, a total number of claims received over the time period, a frequency at which a particular type of exception is generated over the time period, a number of unidentified exceptions that caused or influenced a transaction processing error over the time period, and/or the like. Additionally, transaction management platform 230 may provide the summary statistics for display on a user interface of vendor device 210 and/or client device 220.

Additionally, or alternatively, transaction management platform 230 may generate scheduling information. For example, transaction management platform 230 may generate scheduling information for a transactional document that identifies a processing time period by which the client organization may be eligible for a discount. In this case, transaction management platform 230 may use a machine learning technique to process historical transactional information identifying a processing deadline, a discount deadline, a discount amount, a reminder time period (e.g., a day on which a vendor organization may send a duplicate transactional document as a reminder that the client organization has yet to process the transaction), and/or the like.

Additionally, transaction management platform 230 may use the machine learning technique to determine, for each transactional document, a discount amount prediction, a discount deadline prediction, a processing deadline, and/or the like. As such, transaction management platform 230 may process the discount amount prediction, the discount deadline prediction, the processing deadline, and/or the like, to generate a recommended processing time period by which the client organization should schedule processing of a transactional document in order to maintain eligibility for a particular discount. In some cases, a discount may depend on a particular volume of sales. Here, transaction management platform 230 may track sales volume for a particular product, and generate a recommended processing time period by which the client organization will have sold enough product to be eligible for the discount. In some cases, transaction management platform 230 may automatically implement the scheduling information.

In this way, transaction management platform 230 is able to perform one or more actions associated with correction or prevention of transaction processing errors.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
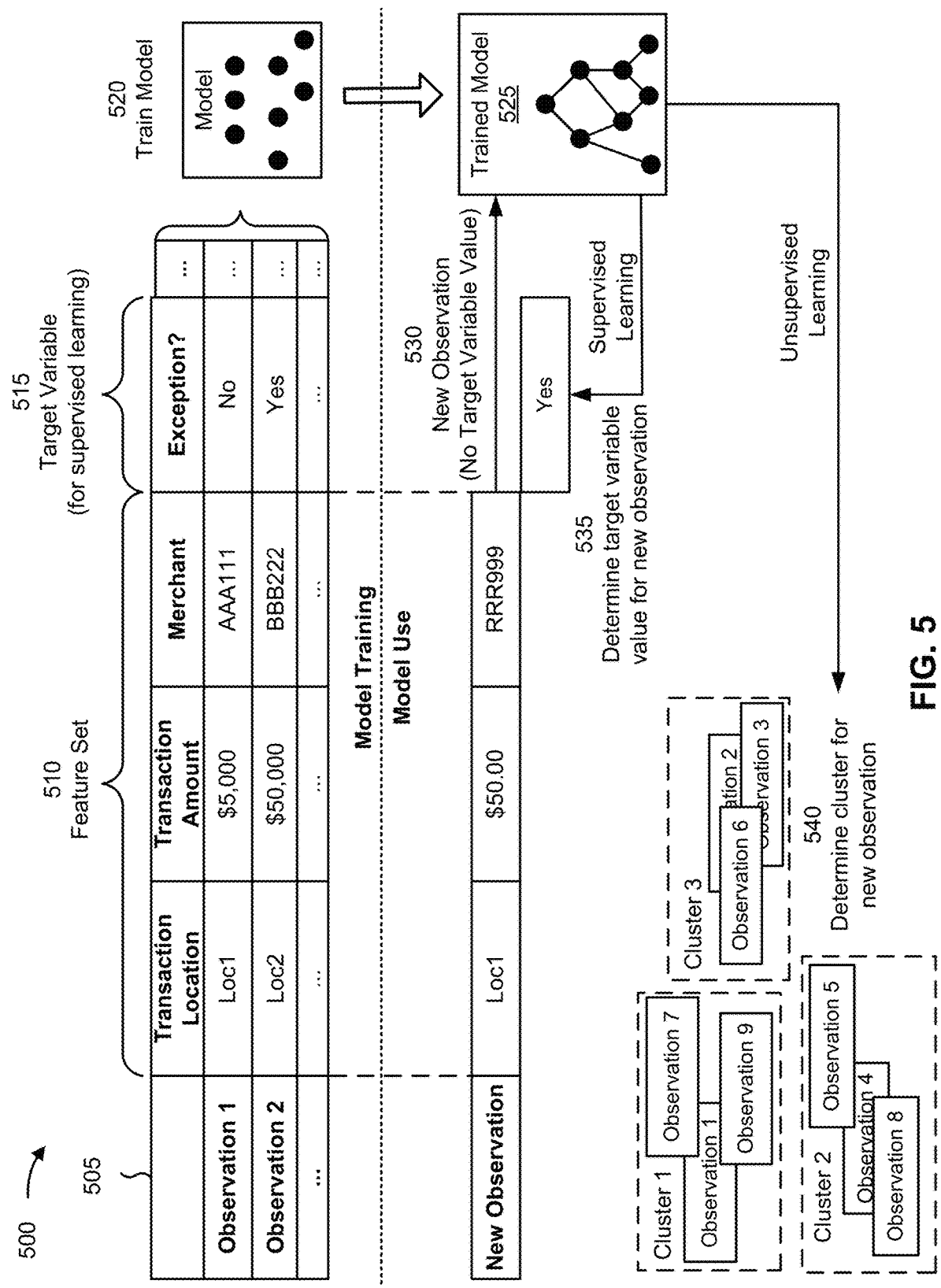
FIG. 5 is a diagram of training and using a machine learning model in connection with end-to-end identification of erroneous data.

FIG. 5 is a diagram illustrating an example 500 of training and using a machine learning model in connection with end-to-end identification of erroneous data. The machine learning model training and usage described herein may be performed using a machine learning system. The machine learning system may include or may be included in a computing device, a server, a cloud computing environment, or the like, such as the transaction management platform described in more detail elsewhere herein.

As shown by reference number 505, a machine learning model may be trained using a set of observations. The set of observations may be obtained from training data (e.g., historical data), such as data gathered during one or more processes described herein. In some implementations, the machine learning system may receive the set of observations (e.g., as input) from a data source, as described elsewhere herein.

As shown by reference number 510, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data source, as described elsewhere herein. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a transaction location, a second feature of a transaction amount, a third feature of a merchant, and so on. As shown, for a first observation, the first feature may have a value of "Loc1", the second feature may have a value of "$5,000", the third feature may have a value of "AAA111", and so on. These features and feature values are provided as examples, and may differ in other examples. For example, the feature set may include one or more of the following features: a transaction time, a transaction type, or a transaction document, among other examples.

As shown by reference number 515, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 500, the target variable is whether an exception is to be flagged for a transaction document having a transaction, which has a value of "No" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 520, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 525 to be used to analyze new observations.

As an example, the machine learning system may obtain training data for the set of observations based on obtaining historical transactional documents from a data source and parsing the historical transactional documents and one or more claims associated therewith (e.g., fraud claims or error claims) to determine whether a transactional document included a transaction for which an exception should have been flagged. Additionally, or alternatively, the machine learning system may obtain training data identifying exceptions in historical transactional documents.

As shown by reference number 530, the machine learning system may apply the trained machine learning model 525 to a new observation, such as by receiving a new observation and inputting the new observation to the trained machine learning model 525. As shown, the new observation may include a first feature of "Loc1", a second feature of "50.00", a third feature of "RRR999", and so on, as an example. The machine learning system may apply the trained machine learning model 525 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 525 may predict a value of "Yes" for the target variable of whether an exception is to be flagged for a transaction document including the new observation for the new observation, as shown by reference number 535. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, rejecting the transaction for completion. The first automated action may include, for example, alerting a security service that the transaction document may include a fraudulent or erroneous transaction. Additionally, or alternatively, the machine learning system may perform an automated action of automatically correcting a transaction document. For example, the machine learning system may predict that the transaction amount of "$50.00" is a result of a typographic error (e.g., an erroneous decimal place) in a transaction and may correct the transaction to "$5,000". Additionally, or alternatively, the machine learning system may transmit a message indicating the predicted correct transaction amount to enable a user to confirm whether the transaction document was incorrect and to confirm whether the predicted correct transaction amount is to be used instead. In this case, the transaction management platform may communicate with a vendor device and/or a client device to provide an alert regarding the exception, enable a user to confirm that a transaction is erroneous, and/or enable a user to correct an erroneous transaction. In this case, by enabling a user to correct an erroneous transaction at a time of transaction document generation, the machine learning system reduces a utilization of computing resources relative to canceling the transaction as a result of an error and re-performing the transaction at a later time to correct the error. In other words, the transaction management platform enables on-the-fly transaction correction rather than post-hoc transaction correction, which may reduce resource utilization.

As another example, if the machine learning system were to predict a value of "No" for the target variable of whether an exception is to be identified, then the machine learning system may provide a second (e.g., different) recommendation (e.g., that a transaction document does not have an error or evidence of fraud) and/or may perform or cause performance of a second (e.g., different) automated action (e.g., to process or archive a transaction associated with a transactional document that has been analyzed).

In some implementations, the trained machine learning model 525 may classify (e.g., cluster) the new observation in a cluster, as shown by reference number 540. The observations within a cluster may have a threshold degree of similarity. As an example, if the machine learning system classifies the new observation in a first cluster (e.g., a first type of transaction), then the machine learning system may provide a first recommendation, such as that the new observation be analyzed using a second machine learning model trained using other observations from the first cluster. In other words, the machine learning system can first classify a transaction in a particular class, then analyze whether the transaction is an exception from the class. In this case, the machine learning system may classify a transaction as a particular type, but determine that an error is present in the transaction based on comparing the transaction to others of the n In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. For example, when the target variable is a prediction value (e.g., a score on a particular scale, such as 1 to 100) regarding a likelihood that a particular document causes a cancellation or a dispute based on a discrepancy, the transaction management platform may provide a recommendation or perform an automated action. In some implementations, the recommendation or automated action may be selected from a set of configured recommendations or automated actions corresponding to different types of exceptions generated or trends identified. Additionally, or alternatively, the transaction management platform may automatically identify recommendations or automated actions based on data identifying recommendations or actions performed in response to previous identified cancellations, disputes, discrepancies, etc., associated with transaction documents.

In some implementations, the trained machine learning model 525 may be re-trained using feedback information. For example, feedback may be provided to the machine learning model. The feedback may be associated with actions performed based on the recommendations provided by the trained machine learning model 525 and/or automated actions performed, or caused, by the trained machine learning model 525. In other words, the recommendations and/or actions output by the trained machine learning model 525 may be used as inputs to re-train the machine learning model (e.g., a feedback loop may be used to train and/or update the machine learning model). For example, the feedback information may include subsequent analysis of a transaction to determine whether an error was present.

In this way, the machine learning system may apply a rigorous and automated process to analyze transactions on an end-to-end basis (e.g., from an initial transaction in a set of transactions to a final transaction in a set of transactions). The machine learning system may enable recognition and/or identification of tens, hundreds, thousands, or millions of features and/or feature values for tens, hundreds, thousands, or millions of observations, thereby increasing accuracy and consistency and reducing delay associated with transaction processing and error detection relative to requiring computing resources to be allocated for tens, hundreds, or thousands of operators to manually analyze transactions using the features or feature values.

As indicated above, FIG. 5 is provided as an example. Other examples may differ from what is described in connection with FIG. 5.

FIGS. 6A and 6B depict a flowchart of an example process 600 associated with end-to-end identification of erroneous data using machine learning and similarity analysis. In some implementations, one or more process blocks of FIGS. 6A and 6B are performed by a device (e.g., the transaction management platform 230). In some implementations, one or more process blocks of FIGS. 6A and 6B are performed by another device or a group of devices separate from or including the device, such as a client device (e.g., the client device 220) and/or a vendor device (e.g., the vendor device 210). Additionally, or alternatively, one or more process blocks of FIGS. 6A and 6B may be performed by one or more components of device 300, such as processor 320, memory 330, storage component 340, input component 350, output component 360, and/or communication interface 370.

As shown in FIG. 6A, process 600 may include obtaining data associated with a set of documents, the data relating to first entity and a second entity, the set of documents having already been processed (block 610). For example, the device may obtain data associated with a set of documents, the data relating to a first entity and a second entity, the set of documents having already been processed, as described above.

As further shown in FIG. 6A, process 600 may include processing, using one or more machine learning techniques, the data to determine a first group of trends and a second group of trends, each group of trends associated with values included in the set of documents, wherein the first group of trends identifies relationships between the values included in the set of documents and particular processing outcomes associated with the set of documents, and wherein the second group of trends identifies relationships indirectly related to, and being associated with further analyzing to prevent, the particular processing outcomes, wherein at least one trend of the first group of trends or the second group of trends is related to at least one of a document submission time, a document submission source, a document value, or a document error (block 620). For example, the device may process, using one or more machine learning techniques, the data to determine a first group of trends and a second group of trends, each associated with values included in the set of documents, wherein the first group of trends identifies relationships between the values included in the set of documents and particular processing outcomes associated with the set of documents, and wherein the second group of trends identifies relationships indirectly related to, and being associated with further analyzing to prevent, the particular processing outcomes, wherein at least one trend of the first group of trends or the second group of trends is related to at least one of a document submission time, a document submission source, a document value, or a document error, as described above. In some implementations, the first group of trends identifies relationships between the values included in the set of documents and particular processing outcomes associated with the set of documents. In some implementations, the second group of trends identifies relationships indirectly related to, and being associated with further analyzing to prevent, the particular processing outcomes, wherein at least one trend of the first group of trends or the second group of trends is related to at least one of a document submission time, a document submission source, a document value, or a document error.

As further shown in FIG. 6A, process 600 may include receiving a set of new documents associated with the first entity and the second entity (block 630). For example, the device may receive a set of new documents associated with the first entity and the second entity, as described above.

As further shown in FIG. 6A, process 600 may include generating, using a data model associated with the first group of trends and the second group of trends, a prediction value indicating a likelihood of the new documents being problematic documents based on one or more values included in new documents, of the set of new documents, the prediction value including at least one of: a prediction value indicating a likelihood that a particular document causes a cancellation based on a discrepancy, or a prediction value indicating a likelihood that a particular new document causes a dispute based on a discrepancy (block 640). For example, the device may generate, using a data model associated with the first group of trends and the second group of trends, a prediction value indicating a likelihood of the new documents being problematic documents based on one or more values included in new documents, of the set of new documents, the prediction value including at least one of: a prediction value indicating a likelihood that a particular document causes a cancellation based on a discrepancy, or a prediction value indicating a likelihood that a particular new document causes a dispute based on a discrepancy, as described above. In some implementations, generating the prediction value may include the device applying the data model to a new document and identifying a likelihood that the new document is associated with an exception. For example, the device may determine a deviation from a trend, of the first group of trends or the second group of trends, and determine that the deviation from the trend correlates to a particular score (e.g., a particular prediction value). In this case, when the prediction value satisfies a threshold, the device may conclude that the particular new document is associated with an exception (e.g., and will cause a dispute based on a discrepancy).

As shown in FIG. 6B, process 600 may include generating, for the particular document, an exception from at least one of: a first set of exceptions indicating that the new documents are problematic new documents, the exception being based on the prediction value satisfying a threshold associated with one or more of the first group of trends or the second group of trends, or a second set of exceptions indicating that the particular document is duplicative of one or more other documents of the set of new documents, the exception being based on using a similarity analysis technique, the exception being associated with causing or being capable of causing a data structure of the first entity to update erroneously (block 650). For example, the device may generate, for the particular document, an exception from at least one of: a first set of exceptions indicating that the new documents are problematic new documents, the exception being based on the prediction value satisfying a threshold associated with one or more of the first group of trends or the second group of trends, or a second set of exceptions indicating that the particular document is duplicative of one or more other documents of the set of new documents, the exception being based on using a similarity analysis technique, the exception being associated with causing or being capable of causing a data structure of the first entity to update erroneously, as described above. In some implementations, when the exception is from the first set of exceptions, the device may have identified the exception based on a prediction value satisfying a threshold. In other words, when an above-mentioned prediction value satisfies a threshold value associated with the first group of trends of the second group of trends, the device may generate an exception of a type of the first set of exceptions. In contrast, when using the similarity analysis technique results in a determination that two documents share a threshold similarity and/or a prediction score indicating a likelihood of fraud (e.g., as opposed to a similarity relating to a recurring transaction, as described above), the device may generate an exception of a type of the second set of exceptions.

As further shown in FIG. 6B, process 600 may include generating a set of claims based on the exception (block 660). For example, the device may generate a set of claims based on the exception, as described above.

As further shown in FIG. 6B, process 600 may include performing, prior to further processing the set of new documents and based on the set of claims, one or more first actions associated with correction or prevention of one or more processing errors relating to the set of new documents, the one or more processing errors relating to at least one of the first set of exceptions or the second set of exceptions (block 670). For example, the device may perform, prior to further processing the set of new documents and based on the set of claims, one or more first actions associated with correction or prevention of one or more processing errors relating to the set of new documents, the one or more processing errors relating to at least one of the first set of exceptions or the second set of exceptions, as described above.

Process 600 may include additional implementations, such as any single implementation or any combination of implementations described below and/or in connection with one or more other processes described elsewhere herein.

In a first implementation, the first set of exceptions includes at least one of a first exception to flag a document as having a threshold chance of causing the data structure of the first entity to update erroneously, a second exception to flag the document as having a threshold chance of including incorrect values, a third exception to flag the document as having a threshold chance of causing or influencing a cancellation, a fourth exception to flag the document as having a threshold chance of causing or influencing a processing dispute, or a fifth exception to flag the document as having a threshold chance of causing or influencing a delivery issue.

In a second implementation, alone or in combination with the first implementation, process 600 includes generating the exception to flag the particular document, of the one or more documents, as being a problematic document, and the one or more processors, when performing the one or more actions are to compare one or more values identified in the flagged particular document to one or more corresponding values included in the set of documents, wherein the one or more corresponding values are associated with a trend, of the one or more trends, and are to be used as replacement values, generating an updated document that includes the one or more corresponding values, and providing the updated document to a particular device associated with the first entity to allow the particular device associated with the first entity to replace the flagged particular document with the updated document.

In a third implementation, alone or in combination with one or more of the first and second implementations, process 600 includes executing a direct matching technique to compare one or more values included in a first additional document, of the set of new documents, and one or more corresponding values included in the particular document, determining that the values included in the first additional document match the corresponding values that are included in the particular document, and generating the exception based on determining that the values included in the first additional document match the corresponding values that are included in the particular document.

In a fourth implementation, alone or in combination with one or more of the first through third implementations, process 600 includes generating a claim, of the set of claims, indicating that the exception is a valid exception, the exception indicating that the particular document is a duplicate document that has caused the data structure of the first entity to update erroneously, and the one or more processors, when performing the one or more actions, are to generate a request to alter the data structure of the first entity based on the claim indicating that the exception is valid, and provide the request to a particular device associated with the second entity.

In a fifth implementation, alone or in combination with one or more of the first through fourth implementations, process 600 includes generating a claim, of the set of claims, indicating that the exception is a valid exception, the exception indicating that a particular additional document is a duplicate document that is capable of causing the data structure of the first entity to update erroneously, and the one or more processors, when performing the one or more actions, are to generate a request to prevent the particular additional document from being processed, and provide the request to a particular device associated with the first entity.

In a sixth implementation, alone or in combination with one or more of the first through fifth implementations, process 600 includes determining, after determining the one or more trends, a first time period at which a particular device associated with the second entity is likely to provide a duplicate document of a particular additional document to the one or more processors, generating, for the particular additional document, scheduling information identifying a second time period at which to process the particular additional document, wherein the second time period is before the first time period and the first entity is eligible to receive a discount if the particular additional document is processed before the second time period, and providing the scheduling information to a particular device associated with the first entity to permit the particular device associated with the first entity to process the particular additional document before the second time period.

Although FIGS. 6A and 6B show example blocks of process 600, in some implementations, process 600 includes additional blocks, fewer blocks, different blocks, or differently arranged blocks than those depicted in FIGS. 6A and 6B. Additionally, or alternatively, two or more of the blocks of process 600 may be performed in parallel.

By performing actions to prevent transaction processing errors, transaction management platform 230 conserves processing resources that might otherwise be used to resolve issues relating to duplicate transactions and/or problematic transactions. Additionally, by performing actions that are preventative or proactive in nature, transaction management platform 2onserves processing resources and/or network resources relative to an inferior platform that is only able to resolve issues reactively (e.g., the inferior platform may spend processing resources and/or network resources to execute error correction procedures). Furthermore, by correcting and/or preventing transaction processing errors, transaction management platform 230 conserves financial resources of the client organization (e.g., by reducing or eliminating transaction processing errors, by reducing or eliminating human resources devoted to managing the processing of transactions, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        obtain data associated with a set of documents, the data being associated with a first entity and a second entity, the set of documents having been processed;
        process, using one or more machine learning techniques, the data to determine a first group of trends and a second group of trends, each group of trends associated with values included in the set of documents,
        wherein the first group of trends identifies relationships between the values included in the set of documents and particular processing outcomes associated with the set of documents,
        wherein the second group of trends identifies relationships indirectly related to, and being associated with further analyzing to prevent, the particular processing outcomes, and
        wherein at least one trend of the first group of trends or the second group of trends is related to at least one of a document submission time, a document submission source, a document value, or a document error;
    receive a set of new documents associated with the first entity and the second entity;
    generate, using a data model associated with the first group of trends and the second group of trends, a prediction value indicating a likelihood of the new documents
    being problematic documents based on one or more values included m new documents, of the set of documents, the prediction value including at least one of:
        a prediction value indicating a likelihood that a particular document causes a cancellation based on a discrepancy, or
        a prediction value indicating a likelihood that a particular document causes a dispute based on a discrepancy;
    generate, for the particular document, an exception from at least one of:
        a first set of exceptions indicating that the new documents are problematic documents, the exception being based on the prediction value satisfying a threshold associated with one or more of the first group of trends or the second group of trends, or
        a second set of exceptions indicating that the particular document is duplicative of one or more other documents of the set of new documents, the exception being based on using a similarity analysis technique,
            the exception being associated with causing or being capable of causing a data structure of the first entity to update erroneously;
    generate a set of claims based on the exception; and
    perform, prior to further processing the set of new documents and based on the set of claims, one or more actions associated with correction or prevention of one or more processing errors relating to the set of new documents, the one or more processing errors relating to at least one of the first set of exceptions or the second set of exceptions,
    wherein the one or more processors are further to:
        determine, after determining the one or more trends, a first time period at which a particular device associated with the second entity is likely to provide a duplicate document of a particular additional document to the one or more processors;
        generate, for the particular additional document, scheduling information identifying a second time period at which to process the particular additional document,
            wherein the second time period is before the first time period and the first entity is eligible to receive a discount if the particular additional document is processed before the second time period; and provide the scheduling information to a particular device associated with the first entity to permit the particular device associated with the first entity to process the particular additional document before the second time period.

2. The device of claim 1, wherein the first set of exceptions includes at least one of:
- a first exception to flag a document as having a threshold chance of causing the data structure of the first entity to update erroneously,
- a second exception to flag the document as having a threshold chance of including incorrect values,
- a third exception to flag the document as having a threshold chance of causing or influencing a cancellation,
- a fourth exception to flag the document as having a threshold chance of causing or influencing a processing dispute, or
- a fifth exception to flag the document as having a threshold chance of causing or influencing a delivery issue.

3. The device of claim 1, wherein the one or more processors, to generate the exception, are to:
- generate the exception to flag the particular document, of the one or more documents, as being a problematic document; and
- wherein the one or more processors, to perform the one or more actions, are to:
  - compare one or more values identified in the flagged particular document to one or more corresponding values included in the set of documents,
    - wherein the one or more corresponding values are associated with a trend, of the first group of trends or the second group of trends, and are to be used as replacement values,
  - generate an updated document that includes the one or more corresponding values, and
  - provide the updated document to a particular device associated with the first entity to allow the particular device associated with the first entity to replace the flagged particular document with the updated document.

4. The device of claim 1, wherein the one or more processors, to generate the exception, are to:
- execute a direct matching technique to compare one or more values included in a first additional document, of the set of new documents, and one or more corresponding values included in the particular document,
- determine that the values included m the first additional document match the corresponding values that are included in the particular document, and
- generate the exception based on determining that the values included in the first additional document match the corresponding values that are included in the particular document.

5. The device of claim 1, wherein the one or more processors, to generate the set of claims, are to:
- generate a claim, of the set of claims, indicating that the exception Is a valid exception,
  - the exception indicating that the particular document is a duplicate document that has caused the data structure of the first entity to update erroneously; and
  - wherein the one or more processors, to perform the one or more actions, are to:
- generate a request to alter the data structure of the first entity based on the claim indicating that the exception is valid, and
- provide the request to a particular device associated with the second entity.

6. The device of claim 1, wherein the one or more processors, to generate the prediction value, are to:
- generate a prediction that the exception is to be flagged for the particular document,
  - the prediction being associated with a threshold likelihood that the particular document is a problematic document or a duplicative document; and
- wherein the one or more processors, to perform the one or more actions, are to:
  - provide a recommendation relating to altering the document or to omitting the document from processing.

* * * * *